(12) United States Patent
Symington et al.

(10) Patent No.: US 9,644,466 B2
(45) Date of Patent: May 9, 2017

(54) METHOD OF RECOVERING HYDROCARBONS WITHIN A SUBSURFACE FORMATION USING ELECTRIC CURRENT

(71) Applicants: William A. Symington, Houston, TX (US); Erik H Clayton, The Woodlands, TX (US); Robert D. Kaminsky, Houston, TX (US); Larry J Manak, The Woodlands, TX (US); James S. Burns, Sugar Land, TX (US)

(72) Inventors: William A. Symington, Houston, TX (US); Erik H Clayton, The Woodlands, TX (US); Robert D. Kaminsky, Houston, TX (US); Larry J Manak, The Woodlands, TX (US); James S. Burns, Sugar Land, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 0 days.

(21) Appl. No.: 14/884,294

(22) Filed: Oct. 15, 2015

(65) Prior Publication Data
US 2016/0145987 A1 May 26, 2016

Related U.S. Application Data

(60) Provisional application No. 62/082,948, filed on Nov. 21, 2014, provisional application No. 62/082,943, filed on Nov. 21, 2014.

(51) Int. Cl.
*E21B 43/24* (2006.01)
*E21B 43/26* (2006.01)
(Continued)

(52) U.S. Cl.
CPC .......... *E21B 43/2401* (2013.01); *E21B 36/04* (2013.01); *E21B 43/2405* (2013.01);
(Continued)

(58) Field of Classification Search
CPC ...... E21B 43/2401; E21B 43/26; E21B 36/04; E21B 43/2405; E21B 43/24; E21B 43/247

See application file for complete search history.

(56) References Cited

U.S. PATENT DOCUMENTS

| 363,419 A | 5/1887 | Poetsch |
| 895,612 A | 8/1908 | Baker |

(Continued)

FOREIGN PATENT DOCUMENTS

| CA | 994694 | 8/1976 |
| CA | 1288043 | 8/1991 |

(Continued)

OTHER PUBLICATIONS

Ali, A.H.A, et al, (2003) "Watching Rocks Change—Mechanical Earth Modeling", *Oilfield Review*, pp. 22-39.

(Continued)

*Primary Examiner* — Zakiya W Bates
(74) *Attorney, Agent, or Firm* — ExxonMobil Upstream Research Company Law Dept.

(57) ABSTRACT

A method of recovering hydrocarbons includes forming a first electrode by creating a first hydraulic fracture within the subsurface formation and pumping a first electrically conductive material into the first hydraulic fracture; forming a second electrode by creating a second hydraulic fracture within the subsurface formation and pumping a second electrically conductive material into the second hydraulic fracture; electrically connecting a first power transmitting mechanism to the first electrode; electrically connecting a second power transmitting mechanism to the second electrode; and heating the subsurface formation between the first electrode and the second electrode by transmitting an electrical current via the first power transmitting mechanism to the first electrode and via the second power transmitting (Continued)

mechanism to the second electrode and by flowing the electrical current from the first electrode to the second electrode. The electrical current substantially includes a frequency between 60 Hertz and 500 Kilohertz.

29 Claims, 7 Drawing Sheets

(51) Int. Cl.
 E21B 36/04 (2006.01)
 E21B 47/00 (2012.01)
 G01V 3/02 (2006.01)
(52) U.S. Cl.
 CPC .............. *E21B 43/26* (2013.01); *E21B 47/00* (2013.01); *G01V 3/02* (2013.01)

(56) References Cited

U.S. PATENT DOCUMENTS

| | | |
|---|---|---|
| 1,342,780 A | 6/1920 | Vedder |
| 1,422,204 A | 7/1922 | Hoover et al. |
| 1,666,488 A | 4/1928 | Crawshaw |
| 1,701,884 A | 2/1929 | Hogle |
| 1,872,906 A | 8/1932 | Doherty |
| 2,033,560 A | 3/1936 | Wells |
| 2,033,561 A | 3/1936 | Wells |
| 2,534,737 A | 12/1950 | Rose |
| 2,584,605 A | 2/1952 | Merriam et al. |
| 2,634,961 A | 4/1953 | Ljungstrom |
| 2,732,195 A | 1/1956 | Ljungstrom |
| 2,777,679 A | 1/1957 | Ljungstrom |
| 2,780,450 A | 2/1957 | Ljungstrom |
| 2,795,279 A | 6/1957 | Sarapuu |
| 2,812,160 A | 11/1957 | West et al. |
| 2,813,583 A | 11/1957 | Marx et al. |
| 2,847,071 A | 8/1958 | De Priester |
| 2,887,160 A | 5/1959 | De Priester |
| 2,895,555 A | 7/1959 | De Priester |
| 2,923,535 A | 2/1960 | Ljungstrom |
| 2,944,803 A | 7/1960 | Hanson |
| 2,952,450 A | 9/1960 | Purre |
| 2,974,937 A | 3/1961 | Kiel |
| 3,004,601 A | 10/1961 | Bodine |
| 3,013,609 A | 12/1961 | Brink |
| 3,095,031 A | 6/1963 | Eurenius et al. |
| 3,106,244 A | 10/1963 | Parker |
| 3,109,482 A | 11/1963 | O'Brien |
| 3,127,936 A | 4/1964 | Eurenius |
| 3,137,347 A | 6/1964 | Parker |
| 3,149,672 A | 9/1964 | Orkiszewski et al. |
| 3,170,815 A | 2/1965 | White |
| 3,180,411 A | 4/1965 | Parker |
| 3,183,675 A | 5/1965 | Schroeder |
| 3,183,971 A | 5/1965 | McEver et al. |
| 3,194,315 A | 7/1965 | Rogers |
| 3,205,942 A | 9/1965 | Sandberg |
| 3,225,829 A | 12/1965 | Chown et al. |
| 3,228,869 A | 1/1966 | Irish |
| 3,241,611 A | 3/1966 | Dougan |
| 3,241,615 A | 3/1966 | Brandt et al. |
| 3,254,721 A | 6/1966 | Smith et al. |
| 3,256,935 A | 6/1966 | Nabor et al. |
| 3,263,211 A | 7/1966 | Heidman |
| 3,267,680 A | 8/1966 | Schlumberger |
| 3,271,962 A | 9/1966 | Dahms et al. |
| 3,284,281 A | 11/1966 | Thomas |
| 3,285,335 A | 11/1966 | Reistle, Jr. |
| 3,288,648 A | 11/1966 | Jones |
| 3,294,167 A | 12/1966 | Vogel |
| 3,295,328 A | 1/1967 | Bishop |
| 3,323,840 A | 6/1967 | Mason et al. |
| 3,358,756 A | 12/1967 | Vogel |
| 3,372,550 A | 3/1968 | Schroeder |
| 3,376,403 A | 4/1968 | Mircea |
| 3,382,922 A | 5/1968 | Needham |
| 3,400,762 A | 9/1968 | Peacock et al. |
| 3,436,919 A | 4/1969 | Shock et al. |
| 3,439,744 A | 4/1969 | Bradley |
| 3,455,392 A | 7/1969 | Prats |
| 3,461,957 A | 8/1969 | West |
| 3,468,376 A | 9/1969 | Slusser et al. |
| 3,494,640 A | 2/1970 | Coberly et al. |
| 3,500,913 A | 3/1970 | Nordgren et al. |
| 3,501,201 A | 3/1970 | Closmann et al. |
| 3,502,372 A | 3/1970 | Prats |
| 3,513,914 A | 5/1970 | Vogel |
| 3,515,213 A | 6/1970 | Prats |
| 3,516,495 A | 6/1970 | Patton |
| 3,521,709 A | 7/1970 | Needham |
| 3,528,252 A | 9/1970 | Gail |
| 3,528,501 A | 9/1970 | Parker |
| 3,547,193 A | 12/1970 | Gill |
| 3,559,737 A | 2/1971 | Ralstin |
| 3,572,838 A | 3/1971 | Templeton |
| 3,592,263 A | 7/1971 | Nelson |
| 3,599,714 A | 8/1971 | Messman |
| 3,602,310 A | 8/1971 | Halbert |
| 3,613,785 A | 10/1971 | Closmann et al. |
| 3,620,300 A | 11/1971 | Crowson |
| 3,642,066 A | 2/1972 | Gill |
| 3,661,423 A | 5/1972 | Garrett |
| 3,692,111 A | 9/1972 | Breithaupt et al. |
| 3,695,354 A | 10/1972 | Dilgren et al. |
| 3,700,280 A | 10/1972 | Papadopoulos et al. |
| 3,724,225 A | 4/1973 | Mancini et al. |
| 3,724,543 A | 4/1973 | Bell et al. |
| 3,729,965 A | 5/1973 | Gartner |
| 3,730,270 A | 5/1973 | Allred |
| 3,739,851 A | 6/1973 | Beard |
| 3,741,306 A | 6/1973 | Papadopoulos |
| 3,759,328 A | 9/1973 | Ueber et al. |
| 3,759,329 A | 9/1973 | Ross |
| 3,759,574 A | 9/1973 | Beard |
| 3,779,601 A | 12/1973 | Beard |
| 3,880,238 A | 4/1975 | Tham et al. |
| 3,882,937 A | 5/1975 | Robinson |
| 3,882,941 A | 5/1975 | Pelofsky |
| 3,888,307 A | 6/1975 | Closmann |
| 3,924,680 A | 12/1975 | Terry |
| 3,943,722 A | 3/1976 | Ross |
| 3,948,319 A | 4/1976 | Pritchett |
| 3,950,029 A | 4/1976 | Timmins |
| 3,958,636 A | 5/1976 | Perkins |
| 3,967,853 A | 7/1976 | Closmann et al. |
| 3,978,920 A | 9/1976 | Bandyopadhyay |
| 3,999,607 A | 12/1976 | Pennington et al. |
| 4,003,432 A | 1/1977 | Paull et al. |
| 4,005,750 A | 2/1977 | Shuck |
| 4,007,786 A | 2/1977 | Schlinger |
| 4,008,762 A | 2/1977 | Fisher et al. |
| 4,008,769 A | 2/1977 | Chang |
| 4,014,575 A | 3/1977 | French et al. |
| 4,030,549 A | 6/1977 | Bouck |
| 4,037,655 A | 7/1977 | Carpenter |
| 4,043,393 A | 8/1977 | Fisher et al. |
| 4,047,760 A | 9/1977 | Ridley |
| 4,057,510 A | 11/1977 | Crouch et al. |
| 4,065,183 A | 12/1977 | Hill et al. |
| 4,067,390 A | 1/1978 | Camacho et al. |
| 4,069,868 A | 1/1978 | Terry |
| 4,071,278 A | 1/1978 | Carpenter et al. |
| 4,093,025 A | 6/1978 | Terry |
| 4,096,034 A | 6/1978 | Anthony |
| 4,125,159 A | 11/1978 | Vann |
| 4,140,180 A | 2/1979 | Bridges et al. |
| 4,148,359 A | 4/1979 | Laumbach et al. |
| 4,149,595 A | 4/1979 | Cha |
| 4,160,479 A | 7/1979 | Richardson et al. |
| 4,163,475 A | 8/1979 | Cha et al. |
| 4,167,291 A | 9/1979 | Ridley |
| 4,169,506 A | 10/1979 | Berry |
| 4,185,693 A | 1/1980 | Crumb et al. |

(56) References Cited

U.S. PATENT DOCUMENTS

| | | |
|---|---|---|
| 4,186,801 A | 2/1980 | Madgavkar et al. |
| 4,193,451 A | 3/1980 | Dauphine |
| 4,202,168 A | 5/1980 | Acheson et al. |
| 4,239,283 A | 12/1980 | Ridley |
| 4,241,952 A | 12/1980 | Ginsburgh |
| 4,246,966 A | 1/1981 | Stoddard et al. |
| 4,250,230 A | 2/1981 | Terry |
| 4,265,310 A | 5/1981 | Britton et al. |
| 4,271,905 A | 6/1981 | Redford et al. |
| 4,272,127 A | 6/1981 | Hutchins |
| 4,285,401 A | 8/1981 | Erickson |
| RE30,738 E | 9/1981 | Bridges et al. |
| 4,318,723 A | 3/1982 | Holmes et al. |
| 4,319,635 A | 3/1982 | Jones |
| 4,320,801 A | 3/1982 | Rowland et al. |
| 4,324,291 A | 4/1982 | Wong et al. |
| 4,340,934 A | 7/1982 | Segesman |
| 4,344,485 A | 8/1982 | Butler |
| 4,344,840 A | 8/1982 | Kunesh |
| 4,353,418 A | 10/1982 | Hoekstra et al. |
| 4,358,222 A | 11/1982 | Landau |
| 4,362,213 A | 12/1982 | Tabor |
| 4,368,921 A | 1/1983 | Hutchins |
| 4,369,842 A | 1/1983 | Cha |
| 4,372,615 A | 2/1983 | Ricketts |
| 4,375,302 A | 3/1983 | Kalmar |
| 4,384,614 A | 5/1983 | Justheim |
| 4,396,211 A | 8/1983 | McStravick et al. |
| 4,397,502 A | 8/1983 | Hines |
| 4,401,162 A | 8/1983 | Osborne |
| 4,412,585 A | 11/1983 | Bouck |
| 4,417,449 A | 11/1983 | Hegarty et al. |
| 4,449,585 A | 5/1984 | Bridges et al. |
| 4,468,376 A | 8/1984 | Suggitt |
| 4,470,459 A | 9/1984 | Copland |
| 4,472,935 A | 9/1984 | Acheson et al. |
| 4,473,114 A | 9/1984 | Bell et al. |
| 4,474,238 A | 10/1984 | Gentry et al. |
| 4,476,926 A | 10/1984 | Bridges et al. |
| 4,483,398 A | 11/1984 | Peters et al. |
| 4,485,869 A | 12/1984 | Sresty et al. |
| 4,487,257 A | 12/1984 | Dauphine |
| 4,487,260 A | 12/1984 | Pittman et al. |
| 4,495,056 A | 1/1985 | Venardos |
| 4,511,382 A | 4/1985 | Valencia et al. |
| 4,532,991 A | 8/1985 | Hoekstra et al. |
| 4,533,372 A | 8/1985 | Valencia et al. |
| 4,537,067 A | 8/1985 | Sharp et al. |
| 4,545,435 A | 10/1985 | Bridges et al. |
| 4,546,829 A | 10/1985 | Martin et al. |
| 4,550,779 A | 11/1985 | Zakiewicz |
| 4,552,214 A | 11/1985 | Forgac et al. |
| 4,567,945 A | 2/1986 | Segalman |
| 4,585,063 A | 4/1986 | Venardos et al. |
| 4,589,491 A | 5/1986 | Perkins |
| 4,589,973 A | 5/1986 | Minden |
| 4,602,144 A | 7/1986 | Vogel |
| 4,607,488 A | 8/1986 | Karinthi et al. |
| 4,626,665 A | 12/1986 | Fort |
| 4,633,948 A | 1/1987 | Closmann |
| 4,634,315 A | 1/1987 | Owen et al. |
| 4,637,464 A | 1/1987 | Forgac et al. |
| 4,640,352 A | 2/1987 | Vanmeurs et al. |
| 4,671,863 A | 6/1987 | Tejeda |
| 4,694,907 A | 9/1987 | Stahl et al. |
| 4,704,514 A | 11/1987 | Van Egmond et al. |
| 4,705,108 A | 11/1987 | Little et al. |
| 4,706,751 A | 11/1987 | Gonduin |
| 4,730,671 A | 3/1988 | Perkins |
| 4,737,267 A | 4/1988 | Pao et al. |
| 4,747,642 A | 5/1988 | Gash et al. |
| 4,754,808 A | 7/1988 | Harmon et al. |
| 4,776,638 A | 10/1988 | Hahn |
| 4,779,680 A | 10/1988 | Sydansk |
| 4,815,790 A | 3/1989 | Rosar et al. |
| 4,817,711 A | 4/1989 | Jeambey |
| 4,828,031 A | 5/1989 | Davis |
| 4,860,544 A | 8/1989 | Krieg et al. |
| 4,886,118 A | 12/1989 | Van Meurs et al. |
| 4,923,493 A | 5/1990 | Valencia et al. |
| 4,926,941 A | 5/1990 | Glandt et al. |
| 4,928,765 A | 5/1990 | Nielson |
| 4,929,341 A | 5/1990 | Thirumalachar et al. |
| 4,954,140 A | 9/1990 | Kawashima et al. |
| 4,974,425 A | 12/1990 | Krieg et al. |
| 5,016,709 A | 5/1991 | Combe et al. |
| 5,036,918 A | 8/1991 | Jennings et al. |
| 5,042,579 A | 8/1991 | Glandt et al. |
| 5,050,386 A | 9/1991 | Krieg et al. |
| 5,051,811 A | 9/1991 | Williams et al. |
| 5,055,030 A | 10/1991 | Schirmer |
| 5,055,180 A | 10/1991 | Klaila |
| 5,082,055 A | 1/1992 | Hemsath |
| 5,085,276 A | 2/1992 | Rivas et al. |
| 5,117,908 A | 6/1992 | Hofmann |
| 5,120,338 A | 6/1992 | Potts, Jr. et al. |
| 5,217,076 A | 6/1993 | Masek |
| 5,236,039 A | 8/1993 | Edelstein |
| 5,255,742 A | 10/1993 | Mikus |
| 5,275,063 A | 1/1994 | Steiger et al. |
| 5,277,062 A | 1/1994 | Blauch et al. |
| 5,297,420 A | 3/1994 | Gilliland |
| 5,297,626 A | 3/1994 | Vinegar et al. |
| 5,305,829 A | 4/1994 | Kumar |
| 5,325,918 A | 7/1994 | Berryman et al. |
| 5,346,307 A | 9/1994 | Ramirez et al. |
| 5,372,708 A | 12/1994 | Gewertz |
| 5,377,756 A | 1/1995 | Northrop et al. |
| 5,392,854 A | 2/1995 | Vinegar et al. |
| 5,411,089 A | 5/1995 | Vinegar et al. |
| 5,416,257 A | 5/1995 | Peters |
| 5,539,853 A | 7/1996 | Jamaluddin et al. |
| 5,620,049 A | 4/1997 | Gipson et al. |
| 5,621,844 A | 4/1997 | Bridges |
| 5,621,845 A | 4/1997 | Bridges et al. |
| 5,635,712 A | 6/1997 | Scott et al. |
| 5,661,977 A | 9/1997 | Shnell |
| 5,724,805 A | 3/1998 | Golomb et al. |
| 5,730,550 A | 3/1998 | Andersland et al. |
| 5,753,010 A | 5/1998 | Sircar |
| 5,838,634 A | 11/1998 | Jones et al. |
| 5,844,799 A | 12/1998 | Joseph et al. |
| 5,868,202 A | 2/1999 | Hsu |
| 5,899,269 A | 5/1999 | Wellington et al. |
| 5,905,657 A | 5/1999 | Celniker |
| 5,907,662 A | 5/1999 | Buettner |
| 5,938,800 A | 8/1999 | Verrill et al. |
| 5,956,971 A | 9/1999 | Cole et al. |
| 6,015,015 A | 1/2000 | Luft et al. |
| 6,016,867 A | 1/2000 | Gregoli et al. |
| 6,023,554 A | 2/2000 | Vinegar et al. |
| 6,055,803 A | 5/2000 | Mastronarde et al. |
| 6,056,057 A | 5/2000 | Vinegar et al. |
| 6,079,499 A | 6/2000 | Mikus et al. |
| 6,112,808 A | 9/2000 | Isted |
| 6,148,602 A | 11/2000 | Demetri |
| 6,148,911 A | 11/2000 | Gipson et al. |
| 6,158,517 A | 12/2000 | Hsu |
| 6,199,634 B1 | 3/2001 | Selyakov |
| 6,246,963 B1 | 6/2001 | Cross et al. |
| 6,247,358 B1 | 6/2001 | Dos Santos |
| 6,319,395 B1 | 11/2001 | Kirkbride et al. |
| 6,328,104 B1 | 12/2001 | Graue |
| 6,409,226 B1 | 6/2002 | Slack et al. |
| 6,434,435 B1 | 8/2002 | Tubel et al. |
| 6,434,436 B1 | 8/2002 | Adamy et al. |
| 6,480,790 B1 | 11/2002 | Calvert et al. |
| 6,540,018 B1 | 4/2003 | Vinegar et al. |
| 6,547,956 B1 | 4/2003 | Mukherjee et al. |
| 6,581,684 B2 | 6/2003 | Wellington et al. |
| 6,585,046 B2 | 7/2003 | Neuroth et al. |
| 6,589,303 B1 | 7/2003 | Lokhandwale et al. |
| 6,591,906 B2 | 7/2003 | Wellington et al. |
| 6,607,036 B2 | 8/2003 | Ranson et al. |

(56) References Cited

U.S. PATENT DOCUMENTS

| | | |
|---|---|---|
| 6,609,735 B1 | 8/2003 | DeLange et al. |
| 6,609,761 B1 | 8/2003 | Ramey et al. |
| 6,659,650 B2 | 12/2003 | Joki et al. |
| 6,659,690 B1 | 12/2003 | Abadi |
| 6,668,922 B2 | 12/2003 | Ziauddin et al. |
| 6,684,644 B2 | 2/2004 | Mittricker et al. |
| 6,684,948 B1 | 2/2004 | Savage |
| 6,708,758 B2 | 3/2004 | de Rouffignac et al. |
| 6,709,573 B2 | 3/2004 | Smith |
| 6,712,136 B2 | 3/2004 | de Rouffignac et al. |
| 6,715,546 B2 | 4/2004 | Vinegar et al. |
| 6,722,429 B2 | 4/2004 | de Rouffignac et al. |
| 6,740,226 B2 | 5/2004 | Mehra et al. |
| 6,742,588 B2 | 6/2004 | Wellington et al. |
| 6,745,831 B2 | 6/2004 | de Rouffignac et al. |
| 6,745,832 B2 | 6/2004 | Wellington et al. |
| 6,745,837 B2 | 6/2004 | Wellington et al. |
| 6,752,210 B2 | 6/2004 | de Rouffignac et al. |
| 6,754,588 B2 | 6/2004 | Cross et al. |
| 6,764,108 B2 | 7/2004 | Ernst et al. |
| 6,782,947 B2 | 8/2004 | de Rouffignac et al. |
| 6,796,139 B2 | 9/2004 | Briley et al. |
| 6,820,689 B2 | 11/2004 | Sarada |
| 6,832,485 B2 | 12/2004 | Surgarmen et al. |
| 6,854,929 B2 | 2/2005 | Vinegar et al. |
| 6,858,049 B2 | 2/2005 | Mittricker |
| 6,877,555 B2 | 4/2005 | Karanikas et al. |
| 6,880,633 B2 | 4/2005 | Wellington et al. |
| 6,887,369 B2 | 5/2005 | Moulton et al. |
| 6,896,053 B2 | 5/2005 | Berchenko et al. |
| 6,896,707 B2 | 5/2005 | O'Rear et al. |
| 6,913,078 B2 | 7/2005 | Shahin et al. |
| 6,915,850 B2 | 7/2005 | Vinegar et al. |
| 6,918,442 B2 | 7/2005 | Wellington et al. |
| 6,918,443 B2 | 7/2005 | Wellington et al. |
| 6,918,444 B2 | 7/2005 | Passey et al. |
| 6,923,257 B2 | 8/2005 | Wellington et al. |
| 6,923,258 B2 | 8/2005 | Wellington et al. |
| 6,929,067 B2 | 8/2005 | Vinegar et al. |
| 6,932,155 B2 | 8/2005 | Vinegar et al. |
| 6,948,562 B2 | 9/2005 | Wellington et al. |
| 6,951,247 B2 | 10/2005 | De Rouffignac et al. |
| 6,953,087 B2 | 10/2005 | de Rouffignac et al. |
| 6,964,300 B2 | 11/2005 | Vinegar et al. |
| 6,969,123 B2 | 11/2005 | Vinegar et al. |
| 6,988,549 B1 | 1/2006 | Babcock |
| 6,991,032 B2 | 1/2006 | Berchenko et al. |
| 6,991,033 B2 | 1/2006 | Wellington et al. |
| 6,994,160 B2 | 2/2006 | Wellington et al. |
| 6,994,169 B2 | 2/2006 | Zhang et al. |
| 6,997,518 B2 | 2/2006 | Vinegar et al. |
| 7,001,519 B2 | 2/2006 | Linden et al. |
| 7,004,247 B2 | 2/2006 | Cole et al. |
| 7,004,251 B2 | 2/2006 | Ward et al. |
| 7,004,985 B2 | 2/2006 | Wallace et al. |
| 7,011,154 B2 | 3/2006 | Maher et al. |
| 7,013,972 B2 | 3/2006 | Vinegar et al. |
| 7,028,543 B2 | 4/2006 | Hardage et al. |
| 7,032,660 B2 | 4/2006 | Vinegar et al. |
| 7,036,583 B2 | 5/2006 | de Rouffignac et al. |
| 7,040,397 B2 | 5/2006 | Rouffignac et al. |
| 7,040,399 B2 | 5/2006 | Wellington et al. |
| 7,043,920 B2 | 5/2006 | Viteri et al. |
| 7,048,051 B2 | 5/2006 | McQueen |
| 7,051,807 B2 | 5/2006 | Vinegar et al. |
| 7,051,811 B2 | 5/2006 | Rouffignac et al. |
| 7,055,600 B2 | 6/2006 | Messier et al. |
| 7,063,145 B2 | 6/2006 | Veenstra et al. |
| 7,066,254 B2 | 6/2006 | Vinegar et al. |
| 7,073,578 B2 | 7/2006 | Vinegar et al. |
| 7,077,198 B2 | 7/2006 | Vinegar et al. |
| 7,077,199 B2 | 7/2006 | Vinegar et al. |
| 7,090,013 B2 | 8/2006 | Wellington |
| 7,093,655 B2 | 8/2006 | Atkinson |
| 7,096,942 B1 | 8/2006 | de Rouffignac et al. |
| 7,096,953 B2 | 8/2006 | de Rouffignac et al. |
| 7,100,994 B2 | 9/2006 | Vinegar et al. |
| 7,103,479 B2 | 9/2006 | Patwardhan et al. |
| 7,104,319 B2 | 9/2006 | Vinegar et al. |
| 7,121,341 B2 | 10/2006 | Vinegar et al. |
| 7,121,342 B2 | 10/2006 | Vinegar et al. |
| 7,124,029 B2 | 10/2006 | Jammes et al. |
| 7,143,572 B2 | 12/2006 | Ooka et al. |
| 7,165,615 B2 | 1/2007 | Vinegar et al. |
| 7,181,380 B2 | 2/2007 | Dusterhoft et al. |
| 7,198,107 B2 | 4/2007 | Maguire |
| 7,219,734 B2 | 5/2007 | Bai et al. |
| 7,225,866 B2 | 6/2007 | Berchenko et al. |
| 7,243,618 B2 | 7/2007 | Gurevich |
| 7,255,727 B2 | 8/2007 | Monereau et al. |
| 7,322,415 B2 | 1/2008 | de St. Remey |
| 7,331,385 B2 | 2/2008 | Symington et al. |
| 7,353,872 B2 | 4/2008 | Sandberg |
| 7,357,180 B2 | 4/2008 | Vinegar et al. |
| 7,405,243 B2 | 7/2008 | Lowe et al. |
| 7,441,603 B2 | 10/2008 | Kaminsky et al. |
| 7,461,691 B2 | 12/2008 | Vinegar et al. |
| 7,472,748 B2 | 1/2009 | Gdanski et al. |
| 7,484,561 B2 | 2/2009 | Bridges |
| 7,516,785 B2 | 4/2009 | Kaminsky |
| 7,516,786 B2 | 4/2009 | Dallas et al. |
| 7,516,787 B2 | 4/2009 | Kaminsky |
| 7,546,873 B2 | 6/2009 | Kim et al. |
| 7,549,470 B2 | 6/2009 | Vinegar et al. |
| 7,556,095 B2 | 7/2009 | Vinegar |
| 7,591,879 B2 | 9/2009 | Sundaram et al. |
| 7,604,054 B2 | 10/2009 | Hocking |
| 7,617,869 B2 | 11/2009 | Carney |
| 7,631,691 B2 | 12/2009 | Symington et al. |
| 7,637,984 B2 | 12/2009 | Adamopoulos |
| 7,644,993 B2 | 1/2010 | Kaminsky et al. |
| 7,647,971 B2 | 1/2010 | Kaminsky |
| 7,647,972 B2 | 1/2010 | Kaminsky |
| 7,654,320 B2 | 2/2010 | Payton |
| 7,669,657 B2 | 3/2010 | Symington et al. |
| 7,743,826 B2 | 6/2010 | Harris et al. |
| 7,798,221 B2 | 9/2010 | Vinegar et al. |
| 7,832,483 B2 | 11/2010 | Trent |
| 7,857,056 B2 | 12/2010 | Kaminsky et al. |
| 7,860,377 B2 | 12/2010 | Vinegar et al. |
| 7,905,288 B2 | 3/2011 | Kinkead |
| 7,980,312 B1 | 7/2011 | Hill et al. |
| 8,087,460 B2 | 1/2012 | Kaminsky |
| 8,127,865 B2 | 3/2012 | Watson et al. |
| 8,176,982 B2 | 5/2012 | Gil et al. |
| 8,356,935 B2 | 1/2013 | Arora et al. |
| 8,540,020 B2 | 9/2013 | Stone et al. |
| 8,596,355 B2 | 12/2013 | Kaminsky et al. |
| 8,608,249 B2 | 12/2013 | Vinegar et al. |
| 8,616,280 B2 | 12/2013 | Kaminsky et al. |
| 8,622,127 B2 | 1/2014 | Kaminsky |
| 8,662,175 B2 | 3/2014 | Karanikas et al. |
| 2001/0049342 A1 | 12/2001 | Passey et al. |
| 2002/0013687 A1 | 1/2002 | Ortoleva |
| 2002/0023751 A1 | 2/2002 | Neuroth et al. |
| 2002/0029882 A1 | 3/2002 | Rouffignac et al. |
| 2002/0049360 A1 | 4/2002 | Wellington et al. |
| 2002/0056665 A1 | 5/2002 | Zeuthen et al. |
| 2002/0077515 A1 | 6/2002 | Wellington et al. |
| 2002/0099504 A1 | 7/2002 | Cross et al. |
| 2003/0070808 A1 | 4/2003 | Allison |
| 2003/0080604 A1 | 5/2003 | Vinegar et al. |
| 2003/0085570 A1 | 5/2003 | Ernst et al. |
| 2003/0111223 A1 | 6/2003 | Rouffignac et al. |
| 2003/0131994 A1 | 7/2003 | Vinegar et al. |
| 2003/0131995 A1 | 7/2003 | de Rouffignac et al. |
| 2003/0141067 A1 | 7/2003 | Rouffignac et al. |
| 2003/0178195 A1 | 9/2003 | Agee et al. |
| 2003/0183390 A1 | 10/2003 | Veenstra et al. |
| 2003/0192691 A1 | 10/2003 | Vinegar et al. |
| 2003/0196788 A1 | 10/2003 | Vinegar et al. |
| 2003/0196789 A1 | 10/2003 | Wellington |
| 2003/0209348 A1 | 11/2003 | Ward et al. |
| 2003/0213594 A1 | 11/2003 | Wellington et al. |

(56) References Cited

U.S. PATENT DOCUMENTS

| | | |
|---|---|---|
| 2004/0020642 A1 | 2/2004 | Vinegar et al. |
| 2004/0040715 A1 | 3/2004 | Wellington et al. |
| 2004/0140095 A1 | 7/2004 | Vinegar et al. |
| 2004/0198611 A1 | 10/2004 | Atkinson |
| 2004/0200618 A1 | 10/2004 | Piekenbrock |
| 2004/0211557 A1 | 10/2004 | Cole et al. |
| 2005/0051327 A1 | 3/2005 | Vinegar et al. |
| 2005/0194132 A1 | 9/2005 | Dudley et al. |
| 2005/0211434 A1 | 9/2005 | Gates et al. |
| 2005/0211569 A1 | 9/2005 | Botte et al. |
| 2005/0229491 A1 | 10/2005 | Loffler |
| 2005/0252656 A1 | 11/2005 | Maguire |
| 2005/0252832 A1 | 11/2005 | Doyle et al. |
| 2005/0252833 A1 | 11/2005 | Doyle et al. |
| 2005/0269077 A1 | 12/2005 | Sandberg |
| 2005/0269088 A1 | 12/2005 | Vinegar et al. |
| 2006/0021752 A1 | 2/2006 | de St. Remey |
| 2006/0100837 A1 | 5/2006 | Symington et al. |
| 2006/0102345 A1 | 5/2006 | McCarthy et al. |
| 2006/0106119 A1 | 5/2006 | Guo et al. |
| 2006/0199987 A1 | 9/2006 | Kuechler et al. |
| 2006/0213657 A1 | 9/2006 | Berchenko et al. |
| 2007/0000662 A1 | 1/2007 | Symington et al. |
| 2007/0023186 A1 | 2/2007 | Kaminsky et al. |
| 2007/0045265 A1 | 3/2007 | McKinzie, II |
| 2007/0045267 A1 | 3/2007 | Vinegar et al. |
| 2007/0084418 A1 | 4/2007 | Gurevich |
| 2007/0095537 A1 | 5/2007 | Vinegar |
| 2007/0102152 A1* | 5/2007 | Forgeron ............ E21B 43/2401 166/249 |
| 2007/0102359 A1 | 5/2007 | Lombardi et al. |
| 2007/0131415 A1 | 6/2007 | Vinegar et al. |
| 2007/0137869 A1 | 6/2007 | MacDougall et al. |
| 2007/0144732 A1 | 6/2007 | Kim et al. |
| 2007/0209799 A1 | 9/2007 | Vinegar et al. |
| 2007/0246994 A1 | 10/2007 | Kaminsky et al. |
| 2008/0073079 A1 | 3/2008 | Tranquilla |
| 2008/0087420 A1 | 4/2008 | Kaminsky et al. |
| 2008/0087421 A1 | 4/2008 | Kaminsky |
| 2008/0087422 A1 | 4/2008 | Kobler et al. |
| 2008/0087426 A1 | 4/2008 | Kaminsky |
| 2008/0087427 A1 | 4/2008 | Kaminsky et al. |
| 2008/0087428 A1 | 4/2008 | Symington et al. |
| 2008/0127632 A1 | 6/2008 | Finkenrath |
| 2008/0173442 A1 | 7/2008 | Vinegar et al. |
| 2008/0173443 A1 | 7/2008 | Symington et al. |
| 2008/0185145 A1 | 8/2008 | Carney et al. |
| 2008/0207970 A1 | 8/2008 | Meurer et al. |
| 2008/0230219 A1 | 9/2008 | Kaminsky |
| 2008/0271885 A1* | 11/2008 | Kaminsky ............... E21B 36/04 166/245 |
| 2008/0277317 A1 | 11/2008 | Touffait et al. |
| 2008/0283241 A1 | 11/2008 | Kaminsky et al. |
| 2008/0289819 A1 | 11/2008 | Kaminsky et al. |
| 2008/0290719 A1 | 11/2008 | Kaminsky et al. |
| 2008/0314593 A1 | 12/2008 | Vinegar et al. |
| 2009/0032251 A1 | 2/2009 | Cavender et al. |
| 2009/0038795 A1 | 2/2009 | Kaminsky et al. |
| 2009/0050319 A1 | 2/2009 | Kaminsky et al. |
| 2009/0101346 A1 | 4/2009 | Vinegar et al. |
| 2009/0101348 A1 | 4/2009 | Kaminsky |
| 2009/0107679 A1 | 4/2009 | Kaminsky |
| 2009/0133935 A1 | 5/2009 | Kinkead |
| 2009/0145598 A1 | 6/2009 | Symington et al. |
| 2009/0200290 A1 | 8/2009 | Cardinal et al. |
| 2009/0211754 A1 | 8/2009 | Verret et al. |
| 2009/0308608 A1 | 12/2009 | Kaminsky et al. |
| 2010/0038083 A1 | 2/2010 | Bicerano |
| 2010/0078169 A1 | 4/2010 | Symington et al. |
| 2010/0089575 A1 | 4/2010 | Kaminsky et al. |
| 2010/0089585 A1 | 4/2010 | Kaminsky |
| 2010/0095742 A1 | 4/2010 | Symington et al. |
| 2010/0101793 A1 | 4/2010 | Symington et al. |
| 2010/0133143 A1 | 6/2010 | Roes et al. |
| 2010/0218946 A1 | 9/2010 | Symington et al. |
| 2010/0276983 A1 | 11/2010 | Dunn et al. |
| 2010/0282460 A1 | 11/2010 | Stone et al. |
| 2010/0307744 A1 | 12/2010 | Cochet et al. |
| 2010/0314108 A1 | 12/2010 | Crews et al. |
| 2010/0319909 A1 | 12/2010 | Symington et al. |
| 2011/0000221 A1 | 1/2011 | Minta et al. |
| 2011/0000671 A1 | 1/2011 | Hershkowitz |
| 2011/0100873 A1 | 5/2011 | Viets et al. |
| 2011/0146981 A1 | 6/2011 | Diehl |
| 2011/0146982 A1 | 6/2011 | Kaminsky et al. |
| 2011/0186295 A1 | 8/2011 | Kaminsky et al. |
| 2011/0257944 A1 | 10/2011 | Du et al. |
| 2011/0290490 A1 | 12/2011 | Kaminsky et al. |
| 2011/0309834 A1 | 12/2011 | Homan et al. |
| 2012/0012302 A1 | 1/2012 | Vogel et al. |
| 2012/0085535 A1 | 4/2012 | Mo et al. |
| 2012/0267110 A1 | 10/2012 | Meurer et al. |
| 2012/0325458 A1 | 12/2012 | El-Rabaa et al. |
| 2013/0043029 A1 | 2/2013 | Vinegar et al. |
| 2013/0106117 A1 | 5/2013 | Sites |
| 2013/0112403 A1 | 5/2013 | Meurer et al. |
| 2013/0277045 A1 | 10/2013 | Parsche |
| 2013/0292114 A1 | 11/2013 | Lin et al. |
| 2013/0292177 A1 | 11/2013 | Meurer et al. |
| 2013/0319662 A1 | 12/2013 | Alvarez et al. |
| 2016/0040519 A1 | 2/2016 | Friesen et al. |

FOREIGN PATENT DOCUMENTS

| | | |
|---|---|---|
| CA | 2377467 | 1/2001 |
| CA | 2560223 | 3/2007 |
| EP | 0387846 | 9/1990 |
| EP | 0866212 | 9/1998 |
| GB | 855408 | 11/1960 |
| GB | 1454324 | 11/1976 |
| GB | 1463444 | 2/1977 |
| GB | 1 478 880 | 7/1977 |
| GB | 1501310 | 2/1978 |
| GB | 1559948 | 1/1980 |
| GB | 1595082 | 8/1981 |
| GB | 2430454 | 3/2007 |
| WO | WO 82/01408 | 4/1982 |
| WO | WO 90/06480 | 6/1990 |
| WO | WO 99/67504 | 12/1999 |
| WO | WO 01/78914 | 10/2001 |
| WO | WO 01/81505 | 11/2001 |
| WO | WO 02/085821 | 10/2002 |
| WO | WO 03/035811 | 5/2003 |
| WO | WO 2005/010320 | 2/2005 |
| WO | WO 2005/045192 | 5/2005 |
| WO | WO 2005/091883 | 10/2005 |
| WO | WO 2006/115943 | 11/2006 |
| WO | WO 2007/033371 | 3/2007 |
| WO | WO 2007/050445 | 5/2007 |
| WO | WO 2007/050479 | 5/2007 |
| WO | WO 2008/115359 | 9/2008 |
| WO | WO 2010/011402 | 1/2010 |
| WO | WO 2010/047859 | 4/2010 |
| WO | WO 2011/116148 | 9/2011 |
| WO | WO 2011/153339 | 12/2011 |
| WO | WO 2014/028834 | 2/2014 |

OTHER PUBLICATIONS

Allred, (1964) "Some Characteristic Properties of Colorado Oil Shale Which May Influence In Situ Processing," *Quarterly Colo. School of Mines, 1st Symposium Oil Shale*, v.59. No. 3, pp. 47-75.

Anderson, R., et al (2003) "Power Generation with 100% Carbon Capture Sequestration" 2nd Annual Conference on Carbon Sequestration, Alexandria, VA.

Asquith, G., et al., (2004) *Basic Well Log Analysis*, Second Ed., Chapter 1, pp. 1-20.

Ball, J.S., et al. (1949) "Composition of Colorado Shale-Oil Naphtha", *Industrial and Engineering Chemistry*, vol. 41, No. 3 pp. 581-587.

Barnes, A. L. et al. (1968) "A Look at In Situ Oil Shale Retorting Methods Based on Limited Heat Transfer Contact Surfaces" Quar-

(56) References Cited

OTHER PUBLICATIONS terly of the Colorado School of Mines *Fifth Symposium on Oil Shale*, v. 63(4), Oct. 1968, pp. 827-852.
Bastow, T.P., (1998) Sedimentary Processes Involving Aromatic Hydrocarbons >>. Thesis (PhD in Applied Chemistry) Curtin University of Technology (Australia), December, p. 1-92.
Baughman, G. L. (1978) *Synthetic Fuels Data Handbook*, Second Edition, Cameron Engineers Inc. pp. 3-145.
Berry, K. L., et al. (1982) "Modified in situ retorting results of two field retorts", Gary, J. H., ed., 15th Oil Shale Symp., CSM, pp. 385-396.
Blanton, T. L. et al, (1999) "Stress Magnitudes from Logs: Effects of Tectonic Strains and Temperature", *SPE Reservoir Eval. & Eng.* 2, vol. 1, February, pp. 62-68.
Bondarenko, S.T., et al., (1959) "Application of electrical current for direct action on a seam of fuel in shaftless underground gasification," Academy of Sciences of the USSR, Translated for Lawrence Livermore Laboratory by Addis Translations International in Mar. 1976, pp. 25-41.
Boyer, H. E. et al. (1985) "Chapter 16: Heat-Resistant Materials," *Metals Handbook*, American Society for Metals, pp. 16-1-16-26.
Brandt, A. R., (2008) "*Converting Oil Shale to Liquid Fuels: Energy Inputs and Greenhouse Gas Emissions of the Shell in Situ Conversion Process*," Environ. Sci. Technol. 2008, 42, pp. 7489-7495.
Brandt, H. et al. (1965) "Stimulating Heavy Oil Reservoirs With Downhole Air-Gas Burners," *World Oil*, (Sep. 1965), pp. 91-95.
Braun, R.L. et al. (1990) "Mathematical model of oil generation, degradation, and expulsion," Energy Fuels, vol. 4, No. 2, pp. 132-146.
Bridges, J. E., et al. (1983) "The IITRI in situ fuel recovery process", *J. Microwave Power*, v. 18, pp. 3-14.
Bridges, J.E., (2007) "Wind Power Energy Storage for In Situ Shale Oil Recovery With Minimal CO2 Emissions", IEEE Transactions on Energy Conversion, vol. 22, No. 1 Mar. 2007, pp. 103-109.
Burnham, A.K. (1979) "Reaction kinetics between CO2 and oil-shale residual carbon 1. Effect of heating rate on reactivity," Fuel, vol. 58, pp. 285-292.
Burnham, A. K. et al. (1983) "High-Pressure Pyrolysis of Green River Oil Shale" in Geochemistry and Chemistry of Oil Shales: ACS Symposium Series, pp. 335-351.
Burwell, E. L. et al. (1970) "Shale Oil Recovery by In-Situ Retorting—A Pilot Study" Journal of Petroleum Engr., Dec. 1970, pp. 1520-1524.
Campbell, J.H. (1978) "The Kinetics of decomposition of Colorado oil shale II. Carbonate minerals," Lawrence Livermore Laboratory UCRL-52089.
Miknis, F.P, et al (1985) "Isothermal Decomposition of Colorado Oil Shale", DOE/FE/60177-2288 (DE87009043) May 1985.
Mohammed, Y.A., et al (2001) "A Mathematical Algorithm for Modeling Geomechanical Rock Properties of the Khuff and PreKhuff Reservoirs in Ghawar Field", *Society of Petroleum Engineers* SPE 68194, pp. 1-8.
Molenaar, M. M. et al, (2004) "Applying Geo-Mechanics and 4D: '4D In-Situ Stress' as a Complementary Tool for Optimizing Field Management", *GulfRocks 2004, 6th North America Rock Mechanics Symposium (NARMS): Rock Mechanics Across Borders and Disciplines*, Houston, Texas, Jun. 5-9, ARMA/NARMS 04-639, pp. 1-8.
Moschovidis, Z. (1989) "Interwell Communication by Concurrent Fracturing—a New Stimulation Technique", *Journ. of Canadian Petro. Tech.* 28(5), pp. 42-48.
Motzfeldt, K. (1954) "The Thermal Decomposition of Sodium Carbonate by the Effusion Method," *Jrnl. Phys. Chem.*, v. LIX, pp. 139-147.
Mut, Stephen (2005) "The Potential of Oil Shale," *Shell Oil Presentation at National Academies, Trends in Oil Supply Demand*, in Washington, DC, Oct. 20-21, 2005, 11 pages.
Needham, et al (1976) "Oil Yield and Quality from Simulated In-Situ Retorting of Green River Oil Shale", Society of Petroleum Engineers of American Institute of Mining, Metallurgical and Petroleum Engineers, Inc. SPE 6069.

Newkirk, A. E. et al. (1958) "Drying and Decomposition of Sodium Carbonate," *Anal. Chem.*, 30(5), pp. 982-984.
Nielsen, K. R., (1995) "Colorado Nahcolite: A Low Cost Source of Sodium Chemicals," *7th Annual Canadian Conference on Markets for Industrial Minerals*, (Vancouver, Canada, Oct. 17-18) pp. 1-9.
Nordin, J. S, et al. (1988), "Groundwater studies at Rio Blanco Oil Shale Company's retort 1 at Tract C-a", DOE/MC/11076-2458.
Nottenburg, R.N. et al. (1979) "Temperature and stress dependence of electrical and mechanical properties of Green River oil shale," *Fuel*, 58, pp. 144-148.
Nowacki, P. (ed.), (1981) *Oil Shale Technical Handbook*, Noyes Data Corp. pp. 4-23, 80-83 & 160-183.
Pattillo, P. D. et al, (1998) "Reservoir Compaction and Seafloor Subsidence at Valhall", SPE 47274, 1998, pp. 377-386.
Pattillo, P. D. et al, (2002) "Analysis of Horizontal Casing Integrity in the Valhall Field", SPE 78204, pp. 1-10.
Persoff, P. et al. (1979) "Control strategies for abandoned in situ oil shale retorts," J. H. Gary (ed.), *12th Oil Shale Symposium Proceedings*, Colorado School of Mines, Golden, CO., Apr. 18-20, pp. 72-80.
Peters, G., (1990) "The Beneficiation of Oil Shale by the Solution Mining of Nahcolite," *23rd Colorado School of Mines Oil Shale Symposium* (Golden, CO) pp. 142-151.
Pope, M.I. et al. (1961) "The specific electrical conductivity of coals," Fuel, vol. 40, pp. 123-129.
Plischke, B., (1994) "Finite Element Analysis of Compaction and Subsidence—Experience Gained from Several Chalk Fields", *Society of Petroleum Engineers*, SPE 28129, 1994, pp. 795-802.
Poulson, R. E., et al. (1985), "Organic Solute Profile of Water from Rio Blanco Retort 1", DOE/FE/60177-2366.
Prats, M. et al. (1975) "The Thermal Conductivity and Diffusivity of Green River Oil Shales", *Journal of Petroleum Technology*, pp. 97-106, Jan. 1975.
Prats, M., et al. (1977) "Soluble-Salt Processes for In-Situ Recovery of Hydrocarbons from Oil Shale," *Journal of Petrol. Technol.*, pp. 1078-1088.
Rajeshwar, K. et al. (1979) "Review: Thermophysical Properties of Oil Shales", *Journal of Materials Science*, v.14, pp. 2025-2052.
Ramey, M. et al. (2004) "The History and Performance of Vertical Well Solution Mining of Nahcolite ($NaHCO_3$) in the Piceance Basin, Northwestern, Colorado, USA," *Solution Mining Research Institute: Fall 2004 Technical Meeting* (Berlin, Germany).
Reade Advanced Materials; 2006 About.com Electrical resistivity of materials. [Retrieved on Oct. 15, 2009] Retrieved from internet: URL: http://www.reade.com/Particle%5FBriefings/elec%5Fres.html. Entire Document.
Rio Blanco Oil Shale Company, (1986), "MIS Retort Abandonment Program" Jun. 1986 Pumpdown Operation.
Riva, D. et al. (1998) "Suncor down under: the Stuart Oil Shale Project", Annual Meeting of the *Canadian Inst. of Mining, Metallurgy, and Petroleum*, Montreal, May 3-7.
Robson, S. G. et al., (1981), "Hydrogeochemistry and simulated solute transport, Piceance Basin, northwestern Colorado", U. S. G. S. Prof. Paper 1196.
Rupprecht, R. (1979) "Application of the Ground-Freezing Method to Penetrate a Sequence of Water-Bearing and Dry Formations—Three Construction Cases," *Engineering Geology*, 13, pp. 541-546.
Ruzicka, D.J. et al. (1987) "Modified Method Measures Bromine Number of Heavy Fuel Oils", *Oil & Gas Journal*, 85(31), Aug. 3, pp. 48-50.
Salamonsson, G. (1951) "The Ljungstrom In Situ Method for Shale-Oil Recovery," *2nd Oil Shale and Cannel Coal Conference*, 2, Glasgow, Scotland, Inst. of Petrol., London, pp. 260-280.
Sahu, D. et al. (1988) "Effect of Benzene and Thiophene on Rate of Coke Formation During Naphtha Pyrolysis", *Canadian Journ. of Chem. Eng.*, 66, Oct. pp. 808-816.
Sandberg, C. R. et al. (1962) "In-Situ Recovery of Oil from Oil Shale—A Review and Summary of Field and Laboratory Studies," RR62.039FR, Nov. 1962.
Sierra, R. et al. (2001) "Promising Progress in Field Application of Reservoir Electrical Heating Methods," *SPE 69709*, SPE Int'l Thermal Operations and Heavy Oil Symposium, Venezuela, Mar. 2001.

(56) References Cited

OTHER PUBLICATIONS

Siskin, M. et al. (1995) "Detailed Structural Characterization of the Organic Material in Rundel Ramsay Crossing and Green River Oil Shales," *Kluwer Academic Publishers*, pp. 143-158.

Smart, K. J. et al, (2004) "Integrated Structural Analysis and Geomechanical Modeling: an Aid to Reservoir Exploration and Development", *Gulf Rocks 2004, 6th North America Rock Mechanics Symposium (NARMS): Rock Mechanics Across Borders and Disciplines*, Houston, Texas, Jun. 5-9, ARMA/NARMS 04-470.

Smith, F. M. (1966) "A Down-hole Burner—Versatile Tool for Well Heating," *25th Tech. Conf on Petroleum Production*, Pennsylvania State Univ., pp. 275-285.

Sresty, G. C.; et al. (1982) "Kinetics of Low-Temperature Pyrolysis of Oil Shale by the IITRI RF Process," *Colorado School of Mines; Fifteenth Oil Shale Symposium Proceedings*, Aug. 1982, pp. 411-423.

Stanford University, (2008) "Transformation of Resources to Reserves: Next Generation Heavy-Oil Recovery Techniques", Prepared for U.S. Department of Energy, National Energy Technology Laboratory, DOE Award No. DE-FC26-04NT15526, Mar. 28, 2008.

Stevens, A. L., and Zahradnik, R. L. (1983) "Results from the simultaneous processing of modified in situ retorts 7& 8", Gary, J. H., ed., *16th Oil Shale Symp.*, CSM, p. 267-280.

Stoss, K. et al. (1979) "Uses and Limitations of Ground Freezing With Liquid Nitrogen," *Engineering Geology*, 13, pp. 485-494.

Symington, W.A., et al (2006) "ExxonMobil's electrofrac process for in situ oil shale conversion," *26th Oil Shale Symposium*, Colorado School of Mines.

Syunyaev, Z.I. et al. (1965) "Change in the Resistivity of Petroleum Coke on Calcination," *Chemistry and Technology of Fuels and Oils*, 1(4), pp. 292-295.

Taylor, O. J., (1987), "Oil Shale, Water Resources and Valuable Minerals of the Piceance Basin, Colorado: The Challenge and Choices of Development". U. S. Geol. Survey Prof. Paper 1310, pp. 63-76.

Templeton, C. C. (1978) "Pressure-Temperature Relationship for Decomposition of Sodium Bicarbonate from 200 to 600° F.," *J. of Chem. and Eng. Data*, 23(1), pp. 7-8.

Thomas, A. M. (1963) "Thermal Decomposition of Sodium Carbonate Solutions," *J. of Chem. and Eng. Data*, 8(1), pp. 51-54.

Thomas, G. W. (1964) "A Simplified Model of Conduction Heating in Systems of Limited Permeability," *Soc.Pet. Engineering Journal*, Dec. 1964, pp. 335-344.

Thomas, G. W. (1966) "Some Effects of Overburden Pressure on Oil Shale During Underground Retorting," *Society of Petroleum Engineers Journal*, pp. 1-8, Mar. 1966.

Tihen, S. S. et al. (1967) "Thermal Conductivity and Thermal Diffusivity of Green River Oil Shale," *Thermal Conductivity: Proceedings of the Seventh Conference* (Nov. 13-16, 1967), *NBS Special Publication* 302, pp. 529-535, 1968.

Tisot, P. R. et al. (1970) "Structural Response of Rich Green River Oil Shales to Heat and Stress and Its Relationship to Induced Permeability," *Journal of Chemical Engineering Data*, v. 15(3), pp. 425-434.

Tisot, P. R. et al. (1971) "Structural Deformation of Green River Oil Shale as It Relates to In Situ Retorting," *US Bureau of Mines Report of Investigations 7576*, 1971.

Tisot, P. R. (1975) "Structural Response of Propped Fractures in Green River Oil Shale as It Relates to Underground Retorting," *US Bureau of Mines Report of Investigations 8021*.

Tissot, B. P., and Welte, D. H. (1984) *Petroleum Formation and Occurrence*, New York, Springer-Verlag, p. 160-198 and 254-266.

Tissot, B. P., and Welte, D. H. (1984) *Petroleum Formation and Occurrence*, New York, Springer-Verlag, p. 267-289 and 470-492.

Turta, A., (1994), "In situ combustion—from pilot to commercial application", *DOE/NIPER Symposium on In Situ Combustion Practices—Past, Present, and Future Application*, Tulsa, OK, Apr. 21-22, No. ISC 3, p. 15-39.

Tyner, C. E. et al. (1982) "Sandia/Geokinetics Retort 23: a horizontal in situ retorting experiment", Gary, J. H., ed., *15th Oil Shale Symp.*, CSM, p. 370-384.

Tzanco, E. T., et al. (1990), "Laboratory Combustion Behavior of Countess B Light Oil", *Petroleum Soc. of CIM and SPE*, Calgary, Jun. 10-13, No. CIM/SPE 90-63, p. 63.1-63.16.

Veatch, Jr. R.W. and Martinez, S.J., et al. (1990) "Hydraulic Fracturing: SPE Reprint Series No. 28", *Soc. of Petroleum Engineers* SPE 14085, Part I, Overview, pp. 12-44.

Vermeulen, F.E., et al. (1983) "Electromagnetic Techniques in the In-Situ Recovery of Heavy Oils", *Journal of Microwave Power*, 18(1) pp. 15-29.

Warpinski, N. R., (1989) "Elastic and Viscoelastic Calculations of Stresses in Sedimentary Basins", *SPE Formation Evaluation*, vol. 4, pp. 522-530.

Yen, T. F. et al. (1976) *Oil Shale*, Amsterdam, Elsevier, p. 215-267.

Yoon, E. et al. (1996) "High-Temperature Stabilizers for Jet Fuels and Similar Hydrocarbon Mixtures. 1. Comparative Studies of Hydrogen Donors", *Energy & Fuels*, 10, pp. 806-811.

Oil & Gas Journal, 1998, "Aussie oil shale project moves to Stage 2", Oct. 26, p. 42.

"Encyclopedia of Chemical Technology" ($4^{th}$ ed.), *Alkali and Chlorine Products*, pp. 1025-1039 (1998).

Bridges, J. et al., "Radio-Frequency Heating to Recover Oil from Tar Sands," The Future of Heavy Crude Oils and Tar Sands, pp. 396-409 (Dec. 31, 1979).

McPherson, R.G., et al., "Recovery of Athabasca Bitumen with Electromagnetic Flood (EMF) Process," *The Journal of Canadian Petroleum*, pp. 44-51 (Feb. 28, 1985).

Charlier, R. et al, (2002) "Numerical Simulation of the Coupled Behavior of Faults During the Depletion of a High-Pressure/High-Temperature Reservoir", *Society of Petroleum Engineers*, SPE 78199, pp. 1-12.

Chute, F. S., and Vermeulen, F. E., (1988) "Present and potential applications of electromagnetic heating in the In-Situ recovery of oil", AOSTRA J. Res., v. 4, pp. 19-33.

Chute, F. S. and Vermeulen, F.E., (1989) "Electrical heating of reservoirs", Hepler, L., and Hsi, C., eds., AOSTRA Technical Handbook on Oil Sands, Bitumens, and Heavy Oils, Chapt. 13, pp. 339-376.

Cipolla, C.L., et al. (1994), "Practical Application of in-situ Stress Profiles", *Society of Petroleum Engineers*, SPE 28607, pp. 487-499.

Cook, G. L. et al. (1968) "The Composition of Green River Shale Oils" United Nations Symposium of the Development and Utilization of Oil Shale Resources, pp. 3-23.

Covell, J. R., et al. (1984) "Indirect in situ retorting of oil shale using the TREE process", Gary, J. H., ed., 17th Oil Shale Symposium Proceedings, Colorado School of Mines, pp. 46-58.

Cummins, J. J. et al. (1972) Thermal Degradation of Green River Kerogen at 150 to 350C: Rate of Product Formation, Report of Investigation 7620, *US Bureau of Mines*, 1972, pp. 1-15.

Day, R. L., (1998) "Solution Mining of Colorado Nahcolite," Wyoming State Geological Survey Public Information Circular 40, *Proceedings of the First International Soda Ash Conference*, V.II (Rock Springs, Wyoming, Jun. 10-12) pp. 121-130.

DePriester, C. et al. (1963) "Well Stimulation by Downhole Gas-Air Burner," *Jrnl. Petro. Tech.*, (Dec. 1963), pp. 1297-1302.

Domine, F. et al. (2002) "Up to What Temperature is Petroleum Stable? New Insights from a 5200 Free Radical Reactions Model", *Organic Chemistry*, 33, pp. 1487-1499.

Dougan, P. M. et al. (1981) "BX In Situ Oil Shale Project," *Colorado School of Mines; Fourteenth Oil Shale Symposium Proceedings*, 1981, pp. 118-127.

Dougan, P. M. (1979) "The BX In Situ Oil Shale Project," *Chem. Engr. Progress*, pp. 81-84.

Duba, A.G. (1977) "Electrical conductivity of coal and coal char," Fuel, vol. 56, pp. 441-443.

Duba, A. (1983) "Electrical conductivity of Colorado oil shale to 900C," Fuel, vol. 62, pp. 966-972.

Duncan, D. C., (1967) "Geologic Setting of Oil Shale Deposits and World Prospects," in *Proceedings of the Seventh World Petroleum Congress*, v.3, Elsevier Publishing, pp. 659-667.

(56) References Cited

OTHER PUBLICATIONS

Dunks, G. et al. (1983) "Electrochemical Studies of Molten Sodium Carbonate," *Inorg. Chem.*, 22, pp. 2168-2177.

Dusseault, M.B. (1998) "Casing Shear: Causes, Cases, Cures", Society of Petroleum Engineers, SPE 48,864 pp. 337-349.

Dyni, J. R., (1974) "Stratigraphy and Nahcolite Resources of the Saline Facies of the Green River Formation in Northwest Colorado," in D.K. Murray (ed.), *Guidebook to the Energy Resources of the Piceance Creek Basin Colorado, Rocky Mountain Association of Geologists*, Guidebook, pp. 111-122.

Fainberg, V. et al. (1998) "Integrated Oil Shale Processing Into Energy and Chemicals Using Combined-Cycle Technology," *Energy Sources*, v.20.6, pp. 465-481.

Farouq Ali, S. M., (1994), "Redeeming features of in situ combustion", DOE/NIPER *Symposium on In Situ Combustion Practices—Past, Present, and Future Application*, Tulsa, OK, Apr. 21-22, No. ISC 1, p. 3-8.

Fisher, S. T. (1980) "A Comparison of Eleven Processes for Production of Energy from the Solid Fossil Fuels of North America," *SPE 9098*, pp. 1-27.

Fox, J. P., et al. (1979) "Partitioning of major, minor, and trace elements during simulated in situ oil shale retorting in a controlled-state retort", Twelfth Oil Shale Symposium Proceedings, Colorado School of Mines, Golden Colorado, Apr. 18-20, 1979.

Fox, J. P, (1980) "Water Quality Effects of LeachatesFrom an In-Situ Oil Shale Industry," *California Univ., Berkeley, Lawrence Berkeley Lab*, Chapters 6-7.

Fredrich, J. T. et al, (1996) "Three-Dimensional Geomechanical Simulation of Reservoir Compaction and Implications for Well Failures in the Belridge Diatomite", *Society of Petroleum Engineers* SPE 36698, pp. 195-210.

Fredrich, J. T. et al, (2000) "Geomechanical Modeling of Reservoir Compaction, Surface Subsidence, and Casing Damage at the Belridge Diatomite Field", *SPE Reservoir Eval. & Eng.3*, vol. 4, August, pp. 348-359.

Fredrich, J. T. et al, (2003) "Stress Perturbations Adjacent to Salt Bodies in the Deepwater Gulf of Mexico", *Society of Petroleum Engineers* SPE 84554, pp. 1-14.

Frederiksen, S. et al, (2000) "A Numerical Dynamic Model for the Norwegian-Danish Basin", *Tectonophysics*, 343, 2001, pp. 165-183.

Freund, H. et al., (1989) "Low-Temperature Pyrolysis of Green River Kerogen", *The American Association of Petroleum Geologists Bulletin*, v. 73, No. 8 (August) pp. 1011-1017.

Gatens III, J. M. et al, (1990) "In-Situ Stress Tests and Acoustic Logs Determine Mechanical Properties and Stress Profiles in the Devonian Shales", *SPE Formation Evaluation* SPE 18523, pp. 248-254.

Garland, T. R., et al. (1979) "Influence of irrigation and weathering reactions on the composition of percolates from retorted oil shale in field lysimeters", Twelfth Oil Shale Symposium Proceedings, Colorado School of Mines, Golden Colorado, Apr. 18-20, 1979, pp. 52-57.

Garthoffner, E. H., (1998), "Combustion front and burned zone growth in successful California ISC projects", SPE 46244.

Greaves, M., et al. (1994) "In situ combustion (ISC) processes: 3D studies of vertical and horizontal wells", *Europe Comm. Heavy Oil Technology in a Wider Europe Symposium*, Berlin, Jun. 7-8, p. 89-112.

Hansen, K. S. et al, (1989) "Earth Stress Measurements in the South Belridge Oil Field, Kern County, California", *SPE Formation Evaluation*, December pp. 541-549.

Hansen, K. S. et al, (1993) "Finite-Element Modeling of Depletion-Induced Reservoir Compaction and Surface Subsidence in the South Belridge Oil Field, California", SPE 26074, pp. 437-452.

Hansen, K. S. et al, (1995) "Modeling of Reservoir Compaction and Surface Subsidence at South Belridge", *SPE Production & Facilities*, August pp. 134-143.

Hardy, M. et al. (2003) "Solution Mining of Nahcolite at the American Soda Project, Piceance Creek, Colorado," *SME Annual Mtg.*, Feb. 24-26, Cincinnati, Ohio, Preprint 03-105.

Hardy, M., et al. (2003) "Solution Mining of Nahcolite at American Soda's Yankee Gulch Project," *Mining Engineering*, Oct. 2003, pp. 23-31.

Henderson, W, et al. (1968) "Thermal Alteration as a Contributory Process to the Genesis of Petroleum", *Nature* vol. 219, pp. 1012-1016.

Hilbert, L. B. et al, (1999) "Field-Scale and Wellbore Modeling of Compaction-Induced Casing Failures", *SPE Drill. & Completion*, 14(2), June pp. 92-101.

Hill, G.R. et al. (1967) "The Characteristics of a Low Temperature In Situ Shale Oil," $4^{th}$ *Symposium on Oil Shale, Quarterly of the Colorado School of Mines*, v.62(3), pp. 641-656.

Hill, G. R. et al. (1967) "Direct Production of a Low Pour Point High Gravity Shale Oil", *I&EC Product Research and Development*, 6(1), Mar. pp. 52-59.

Holditch, S. A., (1989) "Pretreatment Formation Evaluation", *Recent Advances in Hydraulic Fracturing*, SPE Monograph vol. 12, Chapter 2 (Henry L. Doherty Series), pp. 39-56.

Holmes, A. S. et al. (1982) "Process Improves Acid Gas Separation," *Hydrocarbon Processing*, pp. 131-136.

Holmes, A. S. et al. (1983) "Pilot Tests Prove Out Cryogenic Acid-Gas/Hydrocarbon Separation Processes," *Oil & Gas Journal*, pp. 85-86 and 89-91.

Humphrey, J. P. (1978) "Energy from in situ processing of Antrim oil shale", *DOE Report FE-2346-29*.

Ingram, L. L. et al. (1983) "Comparative Study of Oil Shales and Shale Oils from the Mahogany Zone, Green River Formation (USA) and Kerosene Creek Seam, Rundle Formation (Australia)," *Chemical Geology*, 38, pp. 185-212.

Ireson, A. T. (1990) "Review of the Soluble Salt Process for In-Situ Recovery of Hydrocarbons from Oil Shale with Emphasis on Leaching and Possible Beneficiation," *23rd Colorado School of Mines Oil Shale Symposium* (Golden, Colorado), 152-161.

Jacobs, H. R. (1983) "Analysis of the Effectiveness of Steam Retorting of Oil Shale", *AIChE Symposium Series—Heat Transfer*—Seattle 1983 pp. 373-382.

Johnson, D. J. (1966) "Decomposition Studies of Oil Shale," *University of Utah*, May 1966.

Katz, D.L. et al. (1978) *"Predicting Phase Behavior of Condensate/Crude-Oil Systems Using Methane Interaction Coefficients, J. Petroleum Technology"*, pp. 1649-1655.

Kenter, C. J. et al, (2004) "Geomechanics and 4D: Evaluation of Reservoir Characteristics from Timeshifts in the Overburden", *Gulf Rocks 2004, $6^{th}$ North America Rock Mechanics Symposium (NARMS): Rock Mechanics Across Borders and Disciplines*, Houston, Texas, Jun. 5-9, ARMA/NARMS 04-627.

Kilkelly, M. K., et al. (1981), "Field Studies on Paraho Retorted Oil Shale Lysimeters: Leachate, Vegetation, Moisture, Salinity and Runoff, 1977-1980", prepared for Industrial Environmental Research Laboratory, U. S. Environmental Protection Agency, Cincinnati, OH.

Kuo, M. C. T. et al (1979) "Inorganics leaching of spent shale from modified in situ processing," J. H. Gary (ed.) *Twelfth Oil Shale Symposium Proceedings*, Colorado School of Mines, Golden CO., Apr. 18-20, pp. 81-93.

Laughrey, C. D. et al. (2003) "Some Applications of Isotope Geochemistry for Determining Sources of Stray Carbon Dioxide Gas," *Environmental Geosciences*, 10(3), pp. 107-122.

Lekas, M. A. et al. (1991) "Initial evaluation of fracturing oil shale with propellants for in situ retorting—Phase 2", *DOE Report DOE/MC/11076-3064*.

Le Pourhiet, L. et al, (2003) "Initial Crustal Thickness Geometry Controls on the Extension in a Back Arc Domain: Case of the Gulf of Corinth", *Tectonics*, vol. 22, No. 4, pp. 6-1-6-14.

Lundquist, L. (1951) "Refining of Swedish Shale Oil", *Oil Shale Cannel Coal Conference*, vol./Issue: 2, pp. 621-627.

Marotta, A. M. et al, (2003) "Numerical Models of Tectonic Deformation at the Baltica-Avalonia Transition Zone During the Paleocene Phase of Inversion", *Tectonophysics*, 373, pp. 25-37.

\* cited by examiner

METHOD OF RECOVERING HYDROCARBONS WITHIN A SUBSURFACE FORMATION USING ELECTRIC CURRENT

CROSS-REFERENCE TO RELATED APPLICATION

This application claims the benefit of U.S. Provisional Patent Application 62/082,948 filed Nov. 21, 2014 entitled METHOD OF RECOVERING HYDROCARBONS WITHIN A SUBSURFACE FORMATION, and U.S. Provisional Patent Application 62/082,943 filed Nov. 21, 2014 entitled MITIGATING THE EFFECTS OF SUBSURFACE SHUNTS DURING BULK HEATING OF A SUBSURFACE FORMATION, the entirety of both of which are incorporated by reference herein.

BACKGROUND

Fields of Disclosure

The disclosure relates generally to the field of hydrocarbon recovery. More specifically, the disclosure relates to the field of recovering hydrocarbons that are within a subsurface formation.

Description of Related Art

This section is intended to introduce various aspects of the art, which may be associated with the present disclosure. This discussion is believed to assist in providing a framework to facilitate a better understanding of particular aspects of the present disclosure. Accordingly, it should be understood that this section should be read in this light, and not necessarily as admissions of prior art.

Modern society is greatly dependent on the use of hydrocarbons for fuels and chemical feedstocks. Subterranean formations that can be termed "reservoirs" may contain resources, such as hydrocarbons, that can be recovered. Removing hydrocarbons from the subterranean reservoirs depends on numerous physical properties of the subterranean rock formations, such as the permeability of the rock containing the hydrocarbons, the ability of the hydrocarbons to flow through the subterranean rock formations, and the proportion of hydrocarbons present, among other things.

Easily produced sources of hydrocarbons are dwindling, resulting in increased reliance on less conventional sources (i.e., unconventional resources) to satisfy future needs. Examples of unconventional resources may include heavy oil, tar and oil shale. These unconventional resources may complicate production of the hydrocarbons from the subterranean formation. For example, a viscosity of the hydrocarbons may be sufficiently high to prevent production (or at least economical production) of the hydrocarbons from the subterranean formation and/or it may be desirable to change a chemical and/or physical composition (interchangeably referred to as chemical and/or physical property) of the hydrocarbons, such as by decreasing an average molecular weight of the hydrocarbons, prior to production of the hydrocarbons.

Hydrocarbon removal from unconventional resources may be performed by different techniques. In one technique, strip or surface mining may be used to access oil shale and heat may be used to mobilize the oil shale for production. Heat may be applied to the oil shale after placing the mined oil shale in a vessel, such as but not limited to a retort, to heat the oil shale. While strip or surface mining allows for mobilization and production of the oil shale, strip or surface mining is economically challenging. In another technique, thermal processes may be applied to the oil shale. The oil shale may be heated in situ without having to first strip or surface mine the oil shale. Conventional thermal processes, like strip or surface mining, may also be economically challenging.

A need exists for improved technology, including technology that may address one or more of the above described disadvantages. For example, a need exists for recovering hydrocarbons within a subsurface formation in a more economically viable manner.

SUMMARY

The present disclosure provides systems and methods for recovering hydrocarbons within a subsurface formation.

A method of recovering hydrocarbons within a subsurface formation may comprise forming a first electrode by creating a first hydraulic fracture within the subsurface formation and pumping a first electrically conductive material into the first hydraulic fracture; forming a second electrode by creating a second hydraulic fracture within the subsurface formation and pumping a second electrically conductive material into the second hydraulic fracture; electrically connecting a first power transmitting mechanism to the first electrode; electrically connecting a second power transmitting mechanism to the second electrode; and heating the subsurface formation between the first electrode and the second electrode by transmitting an electrical current via the first power transmitting mechanism to the first electrode and via the second power transmitting mechanism to the second electrode and by flowing the electrical current from the first electrode to the second electrode. The electrical current substantially comprises a first frequency between 60 Hertz and 500 Kilohertz.

The foregoing has broadly outlined the features of the present disclosure so that the detailed description that follows may be better understood. Additional features will also be described herein.

BRIEF DESCRIPTION OF THE DRAWINGS

These and other features, aspects and advantages of the present disclosure will become apparent from the following description and the accompanying drawings, which are described briefly below.

Figure 1:
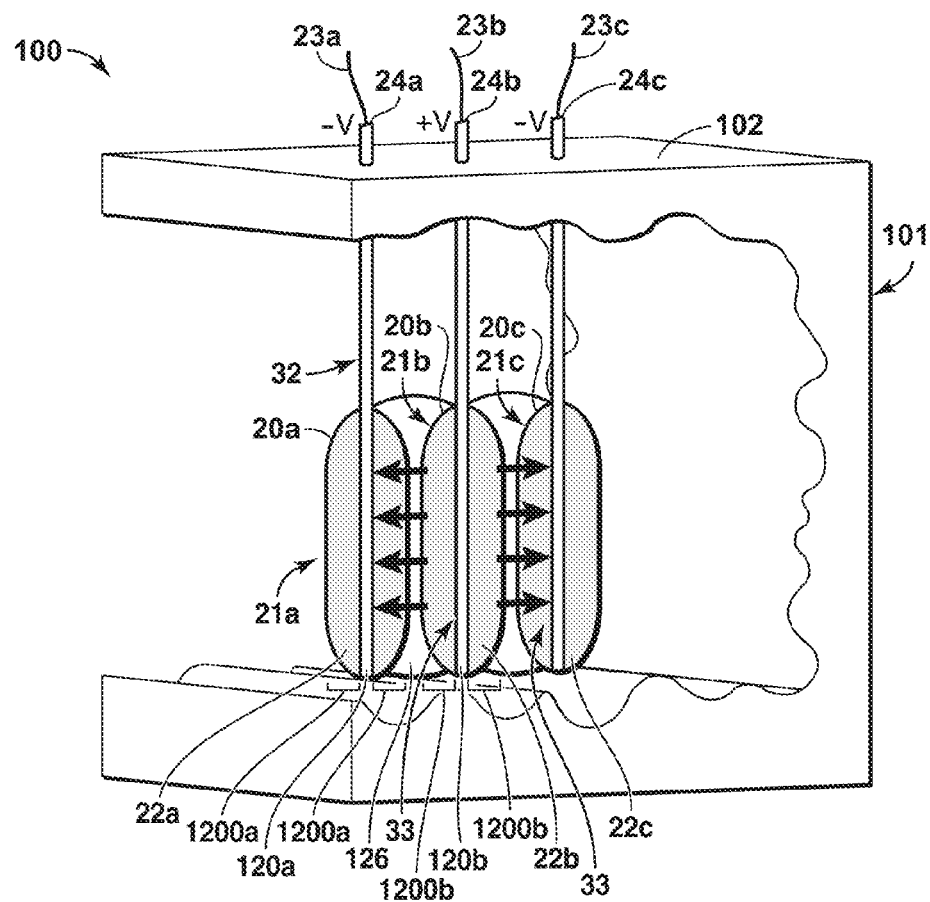
FIG. 1 is a front view of a system for recovering hydrocarbons.

It should be noted that the figures are merely examples and that no limitations on the scope of the present disclosure are intended hereby. Further, the figures are generally not drawn to scale but are drafted for the purpose of convenience and clarity in illustrating various aspects of the disclosure.

DETAILED DESCRIPTION

For the purpose of promoting an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. It will be apparent to those skilled in the relevant art that some features that are relevant to the present disclosure may not be shown in the drawings for the sake of clarity.

At the outset, for ease of reference, certain terms used in this application and their meaning as used in this context are set forth below. To the extent a term used herein is not defined below, it should be given the broadest definition persons in the pertinent art have given that term as reflected in at least one printed publication or issued patent. Further, the present processes are not limited by the usage of the terms shown below, as all equivalents, synonyms, new developments and terms or processes that serve the same or a similar purpose are considered to be within the scope of the present disclosure.

As used herein, the term "hydrocarbon" refers to an organic compound that includes primarily, if not exclusively, the elements hydrogen and carbon. Hydrocarbons may also include other elements, such as, but not limited to, halogens, metallic elements, nitrogen, oxygen, and/or sulfur. Hydrocarbons generally fall into two classes: aliphatic, or straight chain hydrocarbons, and cyclic, or closed ring hydrocarbons, including cyclic terpenes. Examples of hydrocarbon-containing materials include any form of natural gas, oil, coal, heavy oil and kerogen that can be used as a fuel or upgraded into a fuel.

"Heavy oil" includes oils which are classified by the American Petroleum Institute ("API"), as heavy oils, extra heavy oils, or bitumens. The term "heavy oil" includes bitumen. Heavy oil may have a viscosity of about 1,000 centipoise (cP) or more, 10,000 cP or more, 100,000 cP or more, or 1,000,000 cP or more. In general, a heavy oil has an API gravity between 22.3° API (density of 920 kilograms per meter cubed ($kg/m^3$) or 0.920 grams per centimeter cubed ($g/cm^3$)) and 10.0° API (density of 1,000 $kg/m^3$ or 1 $g/cm^3$). An extra heavy oil, in general, has an API gravity of less than 10.0° API (density greater than 1,000 $kg/m^3$ or 1 $g/cm^3$). For example, a source of heavy oil includes oil sand or bituminous sand, which is a combination of clay, sand, water and bitumen. The recovery of heavy oils is based on the viscosity decrease of fluids with increasing temperature or solvent concentration. Once the viscosity is reduced, the mobilization of fluid by steam, hot water flooding, or gravity is possible. The reduced viscosity makes the drainage or dissolution quicker and therefore directly contributes to the recovery rate.

As used herein, the term "hydrocarbon-rich formation" refers to any formation that contains more than trace amounts of hydrocarbons. For example, a hydrocarbon-rich formation may include portions that contain hydrocarbons at a level of greater than 5 percent by volume. The hydrocarbons located in a hydrocarbon-rich formation may include, for example, oil, natural gas, heavy hydrocarbons, and solid hydrocarbons.

As used herein, the terms "produced fluids" and "production fluids" refer to liquids and/or gases removed from a subsurface formation, including, for example, an organic-rich rock formation. Produced fluids may include both hydrocarbon fluids and non-hydrocarbon fluids. Production fluids may include, but are not limited to, liquids and/or gases originating from pyrolysis of oil shale, natural gas, synthesis gas, a pyrolysis product of coal, carbon dioxide, hydrogen sulfide and water (including steam).

As used herein, the term "fluid" refers to gases, liquids, and combinations of gases and liquids, as well as to combinations of gases and solids, and combinations of liquids and solids.

As used herein, the term "formation hydrocarbons" refers to both light and/or heavy hydrocarbons and solid hydrocarbons that are contained in an organic-rich rock formation. Formation hydrocarbons may be, but are not limited to, natural gas, oil, kerogen, oil shale, coal, tar, natural mineral waxes, and asphaltenes.

As used herein, the term "gas" refers to a fluid that is in its vapor phase at 1 atmosphere (atm) and 15 degrees Celsius (° C.).

As used herein, the term "kerogen" refers to a solid, insoluble hydrocarbon that may principally contain carbon, hydrogen, nitrogen, oxygen, and/or sulfur.

As used herein, the term "oil" refers to a hydrocarbon fluid containing primarily a mixture of condensable hydrocarbons.

As used herein, the term "oil shale" refers to any fine-grained, compact, sedimentary rock containing organic matter made up mostly of kerogen, a high-molecular weight solid or semi-solid substance that is insoluble in petroleum solvents and is essentially immobile in its rock matrix.

As used herein, the term "organic-rich rock" refers to any rock matrix holding solid hydrocarbons and/or heavy hydrocarbons. Rock matrices may include, but are not limited to, sedimentary rocks, shales, siltstones, sands, silicilytes, carbonates, and diatomites. Organic-rich rock may contain kerogen.

As used herein, the term "organic-rich rock formation" refers to any formation containing organic-rich rock. Organic-rich rock formations include, for example, oil shale formations, coal formations, oil sands formations or other formation hydrocarbons.

As used herein, "overburden" refers to the material overlying a subterranean reservoir. The overburden may include rock, soil, sandstone, shale, mudstone, carbonate and/or ecosystem above the subterranean reservoir. During surface mining the overburden is removed prior to the start of mining operations. The overburden may refer to formations above or below free water level. The overburden may include zones that are water saturated, such as fresh or saline aquifers. The overburden may include zones that are hydrocarbon bearing.

As used herein, "permeability" is the capacity of a rock to transmit fluids through the interconnected pore spaces of a structure. A customary unit of measurement for permeability is the milliDarcy (mD). The term "absolute permeability" is a measure for transport of a specific, single-phase fluid through a specific portion of a subsurface formation. The term "relative permeability" is defined for relative flow capacity when one or more fluids or one or more fluid phases may be present within the pore spaces, in which the interference between the different fluid types or phases competes for transport within the pore spaces within the subsurface formation. The different fluids present within the pore spaces of the rock may include water, oil and gases of various compositions. Fluid phases may be differentiated as immiscible fluids, partially miscible fluids and vapors. The term "low permeability" is defined, with respect to subsurface formations or portions of subsurface formations, as an average permeability of less than about 10 mD.

As used herein, the term "porosity," refers to the percent volume of pore space in a rock. Porosity is a measure of the rock's storage capacity for fluids. Porosity may be determined from cores, sonic logs, density logs, neutron logs or resistivity logs. Total or absolute porosity includes all the pore spaces, whereas effective porosity includes only the interconnected pores.

As used herein, the term "pyrolysis" refers to the breaking of chemical bonds through the application of heat. For example, pyrolysis may include transforming a compound into one or more other substances by heat alone or by heat in combination with an oxidant. Pyrolysis may include modifying the nature of the compound by addition of hydrogen atoms which may be obtained from molecular hydrogen, water, carbon dioxide, or carbon monoxide. Heat may be transferred to a section of the formation to cause pyrolysis.

As used herein, "reservoir" or "subterranean reservoir" is a subsurface rock or sand formation from which a production fluid or resource can be harvested. The rock formation may include sand, granite, silica, carbonates, clays, and organic matter, such as oil shale, light or heavy oil, gas, or coal, among others. Reservoirs can vary in thickness from less than one foot (0.3048 meter (m)) to hundreds of feet (hundreds of meters).

As used herein, the term "solid hydrocarbons" refers to any hydrocarbon material that is found naturally in substantially solid form at formation conditions. Non-limiting examples include kerogen, coal, shungites, asphaltites, and natural mineral waxes.

As used herein "subsurface formation" refers to the material existing below the Earth's surface. The subsurface formation may interchangeably be referred to as a formation or a subterranean formation. The subsurface formation may comprise a range of components, e.g. minerals such as quartz, siliceous materials such as sand and clays, as well as the oil and/or gas that is extracted.

As used herein, "underburden" refers to the material underlaying a subterranean reservoir. The underburden may include rock, soil, sandstone, shale, mudstone, wet/tight carbonate and/or ecosystem below the subterranean reservoir.

As used herein, "wellbore" is a hole in the subsurface formation made by drilling or inserting a conduit into the subsurface. A wellbore may have a substantially circular cross section or any other cross-section shape, such as an oval, a square, a rectangle, a triangle, or other regular or irregular shapes. The term "well," when referring to an opening in the formation, may be used interchangeably with the term "wellbore." Further, multiple pipes may be inserted into a single wellbore, for example, as a liner configured to allow flow from an outer chamber to an inner chamber.

The terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

The articles "the", "a" and "an" are not necessarily limited to mean only one, but rather are inclusive and open ended so as to include, optionally, multiple such elements.

"At least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, to at least one, optionally including more than one, A, with no B present (and optionally including entities other than B); to at least one, optionally including more than one, B, with no A present (and optionally including entities other than A); to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The disclosure relates to systems and methods for recovering hydrocarbons within a subsurface formation 101 and below the surface 102 of such subsurface formation. FIGS. 1-10 of the disclosure display various aspects of the systems and methods.

Figure 10:
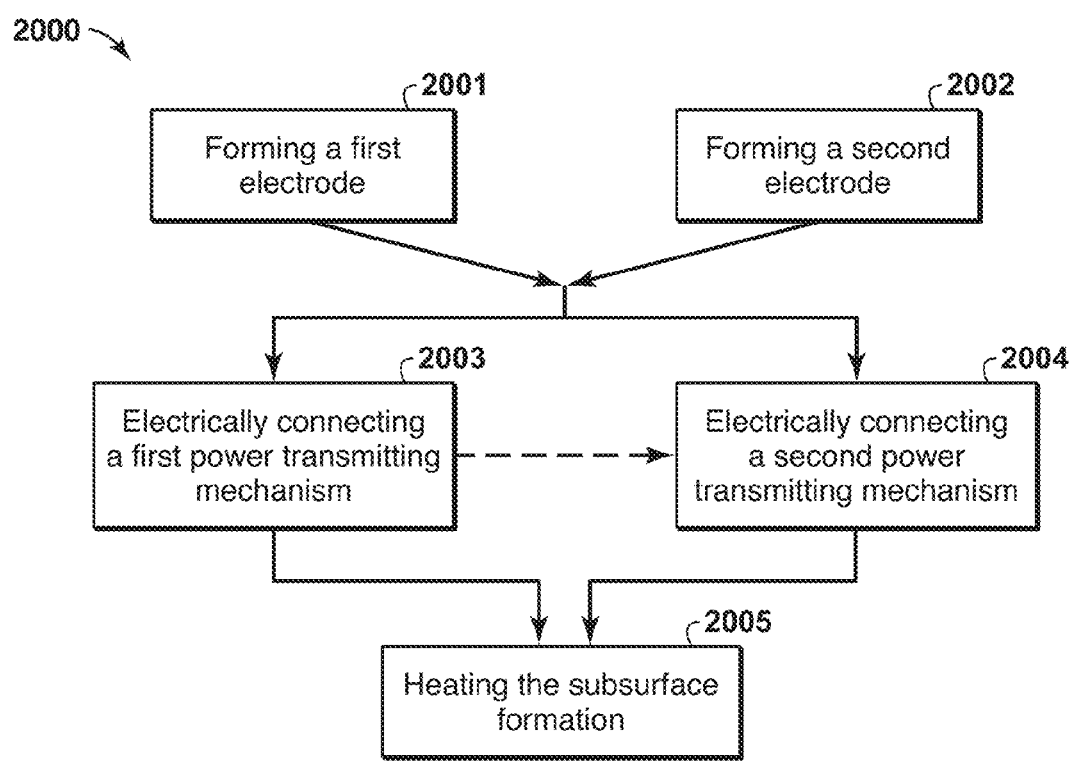
FIG. 10 is a flow chart of a method.

The systems 100 and methods 2000 may include forming a first electrode 21a within the subsurface formation 101. The first electrode 21a may be referred to as an electrode. The first electrode 21a may be formed by creating a first hydraulic fracture 20a, 2001 (FIG. 10). The first electrode 21a may be formed by pumping a first electrically conductive material 22a into the first hydraulic fracture 20a, 2001 (FIG. 10).

The creation of the first hydraulic fracture 20a and the pumping of the first electrically conductive material 22a into the first hydraulic fracture 20a may occur simultaneously. The creation of the first hydraulic fracture 20a and the pumping of the first electrically conductive material 22a may occur simultaneously for the entire time that the first hydraulic fracture 20a is created. The creation of the first hydraulic fracture 20a and the pumping of the first electrically conductive material 22a may occur simultaneously for the entire time that the first hydraulic fracture 20a is created if the first electrically conductive material 22a comprises a material having a substantially small particle size, such as but not limited to graphite cement slurry and/or graphite slurry.

The creation of the first hydraulic fracture 20a may occur before pumping the first electrically conductive material 22a. The creation of the first hydraulic fracture 20a may occur in its entirety (i.e., completely) or for only a portion of the time before pumping the first electrically conductive material 22a. If the creation occurs for only a portion of time before the pumping, the pumping of the first electrically conductive material 22a may continue after the first hydraulic fracture 20a has been created. Creation of the first hydraulic fracture 20a may begin in its entirety or for only a portion of the time before pumping the first electrically conductive material 22a so that the first hydraulic fracture 20a is wide enough to receive the first electrically conductive material 22a without the first electrically conductive material 22a plugging the first hydraulic fracture 20a. If the first electrically conductive material 22a plugs the first hydraulic fracture 20a, the first electrically conductive material 22a may not be able to spread within the first hydraulic fracture 20a. It may be desirable to spread the first electrically conductive material 22a within the first hydraulic fracture 20a to increase the likelihood that the first electrode 21a will more uniformly apply voltage to the subsurface formation. If the creation of the first hydraulic fracture 20a occurs completely before pumping the first electrically conductive material 22a, the pumping of the first electrically conductive material 22a may be done substantially instantaneously after the creation of the first hydraulic fracture 20a ends. The pumping of the first electrically conductive material 22a may be done substantially instantaneously or instantaneously after the creation of the first hydraulic fracture 20a ends so that the first hydraulic fracture 20a cannot close before receiving the first electrically conductive material 22a.

The first hydraulic fracture 20a may be created by pumping a material into the subsurface formation. The material may comprise at least one of water and viscosified water. If the material comprises more than one component, such as but not limited to water and viscosified water, the first hydraulic fracture 20a may be created by pumping the water and then pumping the viscosified water. The viscosified water may increase a width of the first hydraulic fracture. The width of the first hydraulic fracture may extend in a direction perpendicular to a plane of the first hydraulic fracture. The width of the first hydraulic fracture may extend in a direction perpendicular to the Earth's surface if a length of the first hydraulic fracture is substantially horizontal or horizontal. The width of the first hydraulic fracture may extend in a direction parallel to the Earth's surface if the length of the first hydraulic fracture is substantially vertical or vertical. Substantially horizontal or substantially vertical may mean within 15 degrees of the horizontal or vertical, respectively.

The systems 100 and methods 2000 may include forming a second electrode 21b within the subsurface formation 101. The second electrode 21b may be referred to as an electrode. The second electrode 21b may be formed by creating a second hydraulic fracture 20b, 2002 (FIG. 10). The second electrode 21b may be formed by pumping a second electrically conductive material 22b into the second hydraulic fracture 20b, 2002 (FIG. 10).

The second electrode 21b may be formed at the same time or at a different time from the formation of the first electrode 21a. If the second electrode 21b is formed at the same time as the first electrode 21a, only a portion of the second electrode 21b may be formed while the first electrode 21a is formed or all of the second electrode may be formed while the first electrode 21 is formed. The second electrode 21b may be formed before or after the first electrode 21a.

The creation of the second hydraulic fracture 20b and the pumping of the second electrically conductive material 22b into the second hydraulic fracture 20b may occur simultaneously. The creation of the second hydraulic fracture 20b and the pumping of the second electrically conductive material 22b may occur simultaneously for the entire time that the second hydraulic fracture 20b is created. The creation of the second hydraulic fracture 20b and the pumping of the second electrically conductive material 22b may occur simultaneously for the entire time that the second hydraulic fracture 20b is created if the second electrically conductive material 22b comprises a material having a substantially small particle size, such as but not limited to graphite cement slurry and/or graphite slurry.

The creation of the second hydraulic fracture 20b may occur before pumping the second electrically conductive material 22b. The creation of the first hydraulic fracture 20a may occur in its entirety (i.e., completely) or for only a portion of the time before pumping the first electrically conductive material 22a. If the creation occurs for only a portion of time before pumping, the pumping of the second electrically conductive material 22b may continue after the second hydraulic fracture 20b has been created. Creation of the second hydraulic fracture 20b may begin in its entirety or for only a portion of the time before pumping the second electrically conductive material 22b so that the second hydraulic fracture 20b is wide enough to receive the second electrically conductive material 22b without the second electrically conductive material 22b plugging the second hydraulic fracture 20b. If the second electrically conductive material 22b plugs the second hydraulic fracture 20b, the second electrically conductive material 22b may not be able to spread within the second hydraulic fracture 20b. It is desirable to spread the second electrically conductive material 22b within the second hydraulic fracture 20b to increase the likelihood that the second electrode 21b will more uniformly apply voltage to the subsurface formation. If the creation of the second hydraulic fracture 20b occurs completely before pumping the second electrically conductive material 22b, the pumping of the second electrically conductive material 22b may be done substantially instantaneously after the creation of the second hydraulic fracture 20b ends. The pumping of the second electrically conductive material 22b may be done substantially instantaneously after the creation of the second hydraulic fracture 20b ends so that the second hydraulic fracture 20b cannot close before receiving the second electrically conductive material 22b.

The second hydraulic fracture 20b may be created by pumping a material into the subsurface formation. The material may comprise at least one of water and viscosified water. If the material comprises more than one component, such as but not limited to water and viscosified water, the second hydraulic fracture 20b may be created by pumping the water and then pumping the viscosified water. The viscosified water may increase the width of the second hydraulic fracture. The width of the second hydraulic fracture may extend in a direction perpendicular to a plane of the second hydraulic fracture. The width of the second hydraulic fracture may extend in a direction perpendicular to the Earth's surface if a length of the second hydraulic fracture is substantially horizontal or horizontal. The width of the second hydraulic fracture may extend in a direction parallel to the Earth's surface if the length of the second hydraulic fracture is substantially vertical or vertical. Substantially horizontal or substantially vertical may mean within 15 degrees of the horizontal or vertical, respectively.

A first hydraulic fracture first portion 120a of the first hydraulic fracture 20a may be within a first wellbore 32 (FIG. 1). A first hydraulic fracture second portion 1200a of the first hydraulic fracture 20a may be outside of the first wellbore 32. When the first hydraulic fracture first portion 120a is within the first wellbore 32 and the first hydraulic fracture second portion 1200a is outside of the first wellbore 32, the first hydraulic fracture second portion 1200a may emanate from the first hydraulic fracture first portion 120a.

Figure 2:
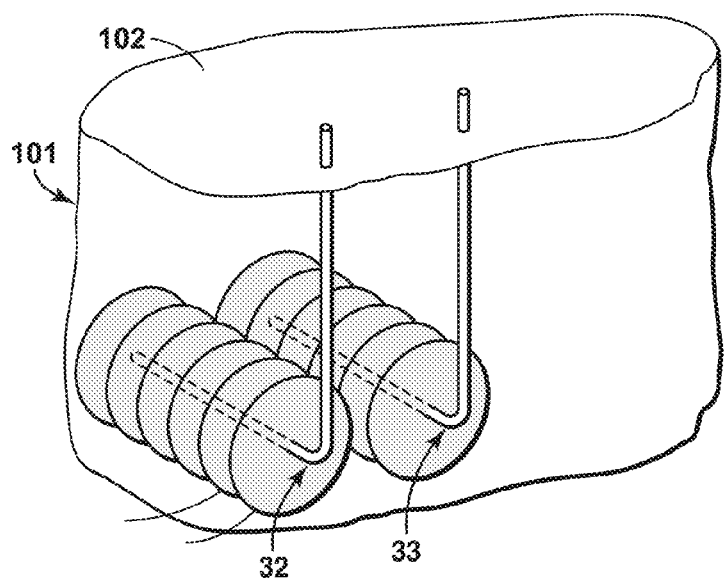
FIG. 2 is a front view of a system for recovering hydrocarbons.

A second hydraulic fracture first portion 120b of the second hydraulic fracture 20b may be within a second wellbore 33 (FIGS. 1-2). A second hydraulic fracture second portion 1200b of the second hydraulic fracture 20b may be outside of the second wellbore 33. When the second hydraulic fracture first portion 120b is within the second wellbore 33 and the second hydraulic fracture second portion 1200b is outside of the second wellbore 33, the second hydraulic fracture second portion 1200b may emanate from the second hydraulic fracture first portion 120b. The second wellbore 33 may be separate from the first wellbore 32. In other words, the second wellbore 33 may not be the first wellbore 32.

The second hydraulic fracture first portion of the second hydraulic fracture 20b may be within the first wellbore 32 (FIG. 2). The second hydraulic fracture second portion of the second hydraulic fracture 20b may be outside of the first wellbore 32. When the second hydraulic fracture first portion is within the first wellbore 32 and the second hydraulic fracture second portion is outside of the first wellbore 32, the second hydraulic fracture second portion may emanate from the second hydraulic fracture first portion. When the second hydraulic fracture first portion is within the first wellbore 32 and the second hydraulic fracture second portion is outside of the first wellbore 32, both the first hydraulic fracture first portion and the second hydraulic fracture first portion are within the first wellbore 32; both the first hydraulic fracture second portion and the second hydraulic fracture second portion may emanate from the first hydraulic fracture first portion and the second hydraulic fracture first portion, respectively.

As shown in FIG. 2, while the above section discusses the first hydraulic fracture 20a and the second hydraulic fracture 20b each having a first hydraulic fracture first portion 120a and a second hydraulic fracture first portion 120b within a wellbore, respectively, such as but not limited to the first wellbore 32 or the second wellbore 33, there may be more than two hydraulic fractures having a portion within and a portion outside of a wellbore, such as but not limited to the first wellbore 32 or the second wellbore 33. As shown in FIG. 2, while the above section discusses first hydraulic fracture 20a and the second hydraulic fracture 20b each having a first hydraulic fracture first portion 120a and a second hydraulic fracture first portion 120b, respectively, within a wellbore, the hydraulic fractures may have a portion within and portion outside of multiple wellbores. While FIG. 2 shows the hydraulic fractures having a portion within and a portion outside of one or more substantially horizontally or horizontally oriented wellbores, a hydraulic fracture could have a portion within and a portion outside of one or more substantially vertically or vertically oriented wellbores. Substantially horizontal or substantially vertical may mean within 15 degrees of the horizontal or vertical, respectively.

The first hydraulic fracture 20a may be any suitable distance from the second hydraulic fracture 20b. For example, the first hydraulic fracture 20a may be between 20 to 100 feet or 20 to 50 feet from the second hydraulic fracture 20b. The first hydraulic fracture 20a may be between any number within and/or bounded by the preceding ranges from the second hydraulic fracture 20b. The first hydraulic fracture 20a may be any suitable distance from the second hydraulic fracture 20b in any direction (e.g., horizontal and vertical).

A height of the first hydraulic fracture 20a may be any suitable height. For example, a height of the first hydraulic fracture 20a may be between 50 to 1000 feet. The height of the first hydraulic fracture 20a may be any number within and/or bounded by the preceding range. The height of the first hydraulic fracture 20a may be perpendicular to the width of the first hydraulic fracture 20a. The width of the first hydraulic fracture 20a is as previously defined.

A height of the second hydraulic fracture 20b may be any suitable height. For example, a height of the second hydraulic fracture 20b may be between 50 to 1000 feet. The height of the second hydraulic fracture 20b may be any number within and/or bounded by the preceding range. The height of the second hydraulic fracture 20b may be perpendicular to the width of the second hydraulic fracture 20b. The width of the second hydraulic fracture 20b is as previously defined.

The first hydraulic fracture 20a may be at least one of substantially horizontal, horizontal, substantially vertical and vertical. The second hydraulic fracture 20b may be at least one of substantially horizontal, horizontal, substantially vertical and vertical. If a hydraulic fracture, such as but not limited to the first hydraulic fracture 20a and/or the second hydraulic fracture 20b, is substantially horizontal, horizontal, substantially vertical, and/or vertical, the hydraulic fracture may be substantially longitudinal to a wellbore that the hydraulic fracture is within. Substantially horizontal or substantially vertical may mean within 15 degrees of the horizontal or vertical, respectively.

The first hydraulic fracture 20a may be substantially parallel or parallel to the second hydraulic fracture 20b. If the first hydraulic fracture 20a is substantially parallel or parallel to the second hydraulic fracture 20b, there is a greater likelihood that uniform heating will occur within the area between the first hydraulic fracture 20a and the second hydraulic fracture 20b. The first hydraulic fracture 20a may not be substantially parallel to the second hydraulic fracture 20b for at least a portion of its length.

The first electrically conductive material 22a and the second electrically conductive material 22b may be any suitable material that distributes electrical current over an entire hydraulic fracture and does not generate heat once at least substantially solidified within the hydraulic fracture. To be suitable, an electrically conductive material may have an electrical conductivity high enough to uniformly or substantially uniformly apply voltage to an entire hydraulic fracture. To be suitable, a candidate electrically conductive material may have sufficient strength to keep a given hydraulic fracture open once the electrically conductive material is pumped into the given hydraulic fracture. To be suitable, an electrically conductive material may have a low enough density to be pumped into a hydraulic fracture. Economic application of methods and systems may set an upper limit on acceptable electrically conductive material cost. To be suitable, an electrically conductive material may not have to be homogenous. To be suitable, an electrically conductive material may be homogenous. To be suitable, an electrically conductive material may comprise a mixture of two or more suitable electrically conductive materials. To be suitable, an electrically conductive material may comprise a mixture of one electrically conductive material and one substantially non-electrically conductive material. The electrically conductive material may be at least one of, but is not limited to, a graphite cement slurry, a graphite slurry, a carbon black slurry and metal coated spheres.

The first electrically conductive material 22a may be the same material as the second electrically conductive material 22b. The first electrically conductive material 22a may be a different material from the second electrically conductive material 22b.

The first electrically conductive material 22a may or may not solidify after being within the first hydraulic fracture 20a for a predetermined period of time; the second electrically conductive material 22b may or may not solidy after being within the second hydraulic fracture 20b for a predetermined period of time. The predetermined period of time may depend on characteristics of the type of electrically conductive material. The first electrically conductive material 22a and/or the second electrically conductive material 22b may or may not be solidified before heating the subsurface formation 101.

The systems 100 and methods 2000 may comprise electrically connecting a first power transmitting mechanism 24 (FIG. 1) to the first electrode 21a, 2003 (FIGS. 1 and 10). The first power transmitting mechanism 24a may be in electrical connection with the first electrically conductive material 22a. The first power transmitting mechanism 24a may be in electrical connection with the first electrically conductive material 22a by being within the first hydraulic fracture 20a. The first power transmitting mechanism 24a does not have to be within the first hydraulic fracture 20a to be in electrical connection with the first electrically conductive material 22a. The first power transmitting mechanism 24a may be any suitable power transmitting mechanism that can be in electrical connection with the first electrically conductive material 22a. For example, the first power transmitting mechanism 24a may include but is not limited to a first wire or first cable.

The systems 100 and methods 2000 may comprise electrically connecting a second power transmitting mechanism 24b (FIG. 1) to the second electrode 21b, 2004 (FIGS. 1 and 10). The second power transmitting mechanism 24b may be in electrical connection with the second electrically conductive material 22b. The second power transmitting mechanism 24b may be in electrical connection with the second electrically conductive material 22b by being within the second hydraulic fracture 20b. The second power transmitting mechanism 24b does not have to be within the second hydraulic fracture 20b to be in electrical connection with the second electrically conductive material 22b. The second power transmitting mechanism 24b may be any suitable power transmitting mechanism that can be in electrical connection with the second electrically conductive material 22b. For example, the second power transmitting mechanism 24b may include but is not limited to a second wire or second cable.

The first power transmitting mechanism 24a may not be the same power transmitting mechanism as the second power transmitting mechanism 24b. If the first power transmitting mechanism 24a is not the same power transmitting mechanism as the second power transmitting mechanism 24b, the first power transmitting mechanism 24a is separate and/or distinct from the second power transmitting mechanism 24b. If the first power transmitting mechanism 24a is not the same power transmitting mechanism as the second power transmitting mechanism 24b, the first power transmitting mechanism 24a is not the second power transmitting mechanism 24b.

The systems 100 and methods 2000 may comprise forming at least two electrodes. The two electrodes may be the first electrode 21a and the second electrode 21b. The amount of electrodes formed may include any number within and/or bounded by the preceding range, such as but not limited to three electrodes. For example, in addition to forming the first electrode 21a and the second electrode 21b, the methods and system may comprise forming a third electrode 21c. The third electrode 21c and any other electrodes may be formed in the same manner as previously described for the first electrode 21a and/or the second electrode 21b. The third electrode 21c and any other electrodes may be positioned with respect to a wellbore, such as but not limited to a first wellbore 32 and a second wellbore 33, in the same manner previously described as may be the case for the first electrode 21a and/or the second electrode 21b.

The additional hydraulic fractures of the respective additional electrodes, such as but not limited to a third hydraulic fracture 20c of the third electrode 21c, may be spaced any distance, which is within the distance range previously described that the first hydraulic fracture 20a is spaced from the second hydraulic fracture 20b, from another electrode, such as the first electrode and/or the second electrode 20b. The height of the additional fractures of the respective additional electrodes may be any height within the same height range previously described for the first hydraulic fracture 20a and/or the second hydraulic fracture 20b.

The additional electrodes may be formed in the same manner previously described for the first electrode and/or the second electrode. The electrically conductive material of each electrode, such as a third electrically conductive material 22c, may have the same and/or similar characteristics to what is previously described for the first electrically conductive material 22a and/or the second electrically conductive material 22b.

The additional hydraulic fractures of the respective additional electrodes may be any orientation (i.e., at least one of substantially horizontal, horizontal, substantially vertical and vertical). The electrodes could be arranged any orientation with respect to the other of the electrodes. For example, the electrodes could be linearly arranged with respect to the other electrodes. Arranging the electrodes linearly could allow for the polarization of adjacent hydraulic fractures of the respective electrodes to be alternated. Substantially horizontal or substantially vertical may mean within 15 degrees of the horizontal or vertical, respectively.

If the systems 100 and methods 2000 comprise more than two electrodes, the systems and methods may comprise electrically connecting a power transmitting mechanism to each of the electrodes. For example but not limited to, if the systems 100 and methods 2000 comprise three electrodes then the systems and methods may comprise electrically connecting the first power transmitting mechanism 24a to the first electrode 21a as described above, electrically connecting the second power transmitting mechanism 24b to the second electrode 21b as described above and electrically connecting the third electrode 21c to a third power transmitting mechanism 24c. The third power transmitting mechanism 24c may operate like the first power transmitting mechanism 21a and the second power transmitting mechanism 21b. Any power transmitting mechanism may operate like the first power transmitting mechanism 24a and the second power transmitting mechanism 24b.

Figure 3:
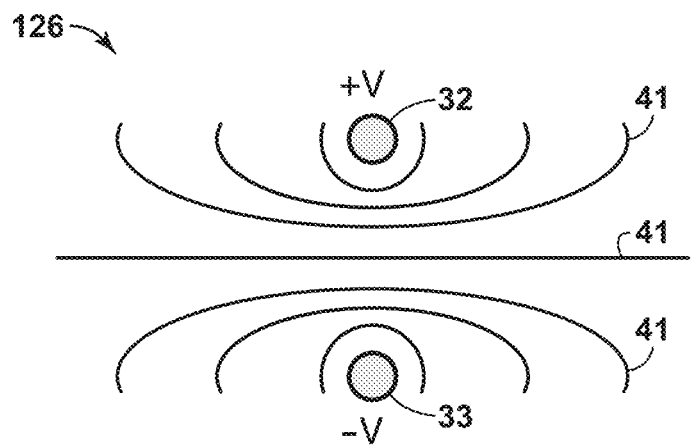
FIG. 3 shows a voltage distribution within an organic-rich rock formation.
Figure 4:
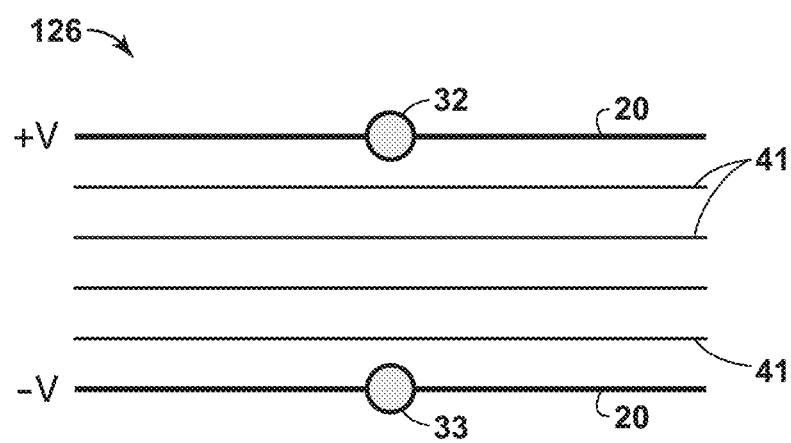
FIG. 4 shows a voltage distribution within an organic-rich rock formation.

The formation of the at least two electrodes by creating a hydraulic fracture (e.g. the first hydraulic fracture 20a, the second hydraulic fracture 20b) helps to ensure that organic-rich rock 126 (FIG. 1) within the subsurface formation 101 is heated enough to maximize an amount of hydrocarbons produced from the organic-rich rock formation. FIG. 3 shows voltage distribution 41 within an organic-rich rock formation 126 with electrodes not formed by the creation of hydraulic fractures while FIG. 4 shows voltage distribution 41 within an organic-rich rock formation 126 with electrodes formed by the creation of hydraulic fractures 20.

As shown in FIG. 3, the contours of voltage distribution 41 within an organic-rich formation 126 that has electrodes 21a, 21b, 21c not formed by the creation of hydraulic fractures 20 is characterized by steep voltage gradients around the wellbores 32, 33 from which an electrical current is transmitted to heat the organic-rich rock formation 126. In contrast, as shown in FIG. 4, the contours of voltage distribution 41 within an organic-rich rock formation that has electrodes 21a, 21b, 21c formed by the creation of hydraulic fractures 20 is characterized by a substantially uniform voltage gradient 41 between the wellbores 32, 33 from which an electrical current is transmitted to heat the organic-rich rock formation 126. Thus, as a result of having electrodes 21a, 21b, 21c formed by the creation of hydraulic fractures 20, the organic-rich rock is more uniformly heated than electrodes 21a, 21b, 21c not formed by the creation of hydraulic fractures 20. The presence of electrodes 21a, 21b, 21c formed by the creation of hydraulic fractures 20 results in a lower impedance near the wellbore 32, 33 than a situation having electrodes 21a, 21b, 21c not formed by the creation of hydraulic fractures 20. The high voltage gradients near the wellbores 32, 33 in an organic-rich rock formation having electrodes 21a, 21b, 21c not formed by the creation of hydraulic fractures 20 causes the higher impedance near the wellbore 32, 33. For example, if 500 foot wide electrodes 21a, 21b, 21c created by hydraulic fractures 20 are spaced 100 feet apart and a 1 foot wellbore radius of the wellbore containing each electrode 21a, 21b, 21c is assumed, the overall impedance between the electrodes 21a, 21b, 21c for the organic-rich rock formation having electrodes 21a, 21b, 21c not formed by the creation of hydraulic fractures 20 is 6.6 times the overall impedance between the electrodes 21a, 21b, 21c formed by the creation of hydraulic fractures 20. As a result, in this example, the organic-rich rock formation having electrodes 21a, 21b, 21c not formed by the creation of hydraulic fractures 20 results in 57% of the total heat dissipation in the organic-rich rock formation occurring within 10 feet of the wellbores, which is detrimental to the heating of organic-rich rock formation.

The methods and systems may comprise heating the subsurface formation 101 between electrodes, such as but not limited to between the first electrode 21a and the second electrode 21b, 2005 (FIG. 10). More specifically, the methods and systems may comprise heating an organic-rich rock formation 126 within the subsurface formation 101 between the first electrode 21a and the second electrode 21b. Heating the subsurface formation 101 between the electrodes may comprise transmitting an electrical current via the first power transmitting mechanism 24a to the first electrode 21a and via the second power transmitting mechanism 24b to the second electrode 21b. Heating the subsurface formation 101 between the electrodes may comprise flowing the electrical current from the first electrode 21a to the second electrode 21b.

The electrical current may be any suitable current. For example, the electrical current may comprise one of alternating current and direct current. The alternating current may be more preferable to direct current because alternating current may be more readily generated and transmitted than direct current. The alternating current may be more preferable to direct current because alternating current may minimize electrochemical erosion; direct current may not minimize electrochemical erosion. Each electrode 21a, 21b, 21c may receive its own electrical current from a wire 23a, 23b, 23c, respectively (FIG. 1).

The electrical current may substantially comprise a first frequency. For example, the first current may substantially comprise at least 50 percent of an electrical power of a total electrical power transmitted. The first frequency may not fall within the range of radio frequencies. The first frequency may be between 60 Hertz (H) and 500 Kilohertz (kHz) or, more specifically, between 60 Hertz and 200 Kilohertz. The first frequency may be any frequency within and/or bounded by any of the preceding first frequency ranges.

If the electrical current comprises alternating electric current, then the alternating current may include multiple frequencies (e.g., a multifrequency approach). If the alternating current includes multiple frequencies, the power transmitting mechanism may comprise a multi-frequency signal generator that can simultaneously generate multiple different frequencies, such as but not limited to a first frequency and a second frequency. If the electrical current comprises alternating electric current, the electrical current transmitted between the electrodes may start out with the transmission of a single frequency and may then move to transmitting multiple frequencies. If the electrical current comprises alternating electrical current, multiple frequencies may always be transmitted between the electrodes. The multiple frequencies may include a low frequency and a high frequency. The low frequency, such as a first frequency, may be any frequency less than or equal to 1000 Hertz. The low frequency may be any frequency within and/or bounded by the preceding range. The high frequency, such as a second frequency, may be any frequency less than or equal to 10000 Hertz, less than or equal to 200 kHz or less than or equal to 500 kHz. The high frequency may be at least ten times greater than the low frequency. The high frequency (e.g., second frequency) may have at least 33% of the electrical power associated with the low frequency (e.g., first frequency). The high frequency may be any frequency within and/or bounded by the preceding ranges. Transmitting a high frequency within a multifrequency approach may heat regions within a subsurface formation that are less susceptible to heating (e.g., have a greater inherent impedance). Transmitting a low frequency within a multifrequency approach may maximize a heating rate. Supplying multiple different frequencies may include supplying a substantial portion of the total energy to a given area within a subsurface formation with the multiple different frequencies. For example, each of the multiple different frequencies may supply at least 30 percent of the total energy to a given area within a subsurface formation. Each of the multiple different frequencies may supply any amount of total energy within and/or bounded by the preceding range. Employing a multifrequency approach may allow for more homogenous heating in heterogeneous rock, like heterogeneous organic-rich rock, than employing a single frequency approach. Providing a more homogenous heating of a rock may delay "electrical channeling" or short circuiting.

The electricity may be an alternating current, such as multi-phase electricity. For example, heating the subsurface formation 101 between the electrodes may utilize at least two-phase electricity. The number of electrical phases may include any number included within and/or bounded by the preceding range. For example, heating the subsurface formation 101 between the electrodes may utilize two-phase electricity or three-phase electricity. If heating the subsurface formation 101 between the electrodes utilizes two phase electricity, the voltage on opposing electrodes may be 180 angular degrees out of phase with one another. If heating the subsurface formation 101 between electrodes utilizes three phase electricity, the voltages on opposing electrodes may be 120 angular degrees out of phase with one another.

If heating the subsurface formation 101 between the electrodes utilizes two-phase electricity, there may be multiple electrode pairs with each electrode pair having two electrodes. Each electrode pair may have a first electrode 180 angular degrees out of phase from a second electrode. For example, as shown in FIG. 1, there are two electrode pairs—the first electrode 21a and the second electrode 21b form one pair, the second electrode 21b and the third electrode 21c form a second pair. In FIG. 1, the first electrode 21a and the third electrode 21c have a negative voltage while the second electrode 21b has a positive voltage. As a result of the voltage differences, the subsurface formation may be heated between the first electrode 21a and the second electrode 21b because the opposing voltages allow for electrical current to flow between the first electrode 21a and the second electrode 21b, and the subsurface formation may be heated between the second electrode 21b and the third electrode 21c because the opposing voltages allow for electrical current to flow between the second electrode 21b and the third electrode.

If heating the subsurface formation 101 between the electrodes utilizes three-phase electricity, the first electrode may be 120 angular degrees out of phase from the second electrode and the third electrode may be 240 angular degrees out of phase from the first electrode and 120 angular degrees out of phase from the second electrode.

Heating the subsurface formation 101 may comprise generating heat within the organic-rich rock formation 126. Generating heat within the organic-rich rock formation 126 may include generating heat between electrodes, such as the first electrode 21a and the second electrode 21b. Generating heat within the organic-rich rock formation 126 may include generating heat between and around the electrodes, such as the first electrode 21a and the second electrode 21b. More heat may be generated between electrodes in a pair than around electrodes in the pair. For example, more heat may be generated between the first electrode 21a and the second electrode 21b and between the second electrode 21b and the third electrode 21c than in the area around the first electrode 21a, the second electrode 21b and the third electrode 21c but not between the first electrode 21a and the second electrode 21b and between the second electrode 21b and the third electrode 21c. The organic-rich rock formation 126 may be between electrodes 21a, 21b, 21c. The organic-rich rock formation 126 may partially and/or completely surround the electrodes 21a, 21b, 21c.

As heat is generated within the organic-rich rock formation, the organic-rich rock formation acts as a heater. In other words, as the heat is generated within the organic-rich rock formation, the organic-rich rock formation 126 conducts the heat to other parts of the rock. Because heat generated within the organic-rich rock formation results in the organic-rich rock formation being a heater, heating the subsurface formation 101 may comprise thermally conducting heat from a portion of the organic-rich rock formation to other portions of the organic-rich rock formation. In other words, heating the subsurface formation 101 may comprise thermally conducting heat from a first organic-rich rock formation location of the organic-rich rock formation to a second organic-rich rock formation location of the organic-rich rock formation. The first organic-rich rock formation location may be located at a different location within the organic-rich rock formation than the second organic-rich rock formation location. The first organic-rich rock formation location may be between the first electrode 21a and the second electrode 21b. The first organic-rich rock formation location may be around the first electrode 21a or the second electrode 21b. The second organic-rich rock formation location may be between the first electrode 21a and the second electrode 21b. The second organic-rich rock formation location may be around the first electrode 21a or the second electrode 21b.

Heating the subsurface formation 101 may comprise applying a first voltage to the first electrode 21a via the first power transmitting mechanism 24a and applying a second voltage to the second electrode 21b via the second power transmitting mechanism 24b. If heating the subsurface formation between the electrodes utilizes two-phase electricity, the first electrode 21a may receive a first voltage that is either positive or negative and the second electrode 21b may receive a second voltage that is either positive or negative. If the first voltage is positive then the second voltage is negative. If the first voltage is negative then the second voltage is positive. If heating the subsurface formation between the electrodes is a heated using three-phase electricity, heating the subsurface formation 101 may comprise applying a first voltage to the first electrode 21a via the first power transmitting mechanism 24a and applying a second voltage to the second electrode 21b via the second power transmitting mechanism 24b and applying a third voltage to the third electrode 21c via the third power transmitting mechanism.

The methods and systems may comprise determining a first voltage amount of the first voltage and a second voltage amount of the second voltage. Determining the first voltage amount and the second voltage amount may comprise calculating an energy amount to be delivered to the subsurface formation to heat the subsurface formation. For example, determining the first voltage amount and the second voltage amount may comprise calculating an energy amount to be delivered to the organic-rich rock formation to heat the organic-rich rock formation so as to pyrolyze the organic-rich rock formation and subsequently produce hydrocarbons.

The energy amount calculated may be one that helps ensure that too fast a heating rate of a rock system of a subsurface formation, such as an organic-rich rock formation of a subsurface formation, is not attempted. Given the natural heterogeneity of rock system, one or more portions of the rock system may have a lower impedance than other portions of the rock system. If too fast a heating rate of the rock system is attempted by delivering too high of an energy amount, the most conductive (i.e., lowest impedance) parts of the rock may be excessively heated before the majority of a rock volume of the rock system reaches pyrolysis temperature. When the most conductive parts of the rock are excessively heated before the majority of the rock volume reaches pyrolysis temperature, the most conductive parts may become so electrically conductive themselves to the point where they provide an electrical channel or short circuit. If an electrical channel is formed, a majority of the electric current transmitted to the rock system may pass through the channel. When the majority of the electric current transmitted to the rock system passes through the channel, insufficient current may pass through the portions of the rock system where the channel has not been formed, thereby preventing the portions of the rock system where the channel has not been formed from receiving enough energy to pyrolyze. If pyrolysis of the rock system does not occur, hydrocarbons cannot be produced because producible hydrocarbons are not generated.

If a lower heating rate of the rock system is attempted by delivering a lower energy amount, thermal conduction may moderate the excessive heat that may generate in the most conductive portions of the rock volume. As a result, channeling may take longer to occur than if a higher heating rate of the rock system is attempted. Because channeling may take longer to occur, more time may be available to allow all of the rock volume to reach pyrolysis temperature.

Figure 6:
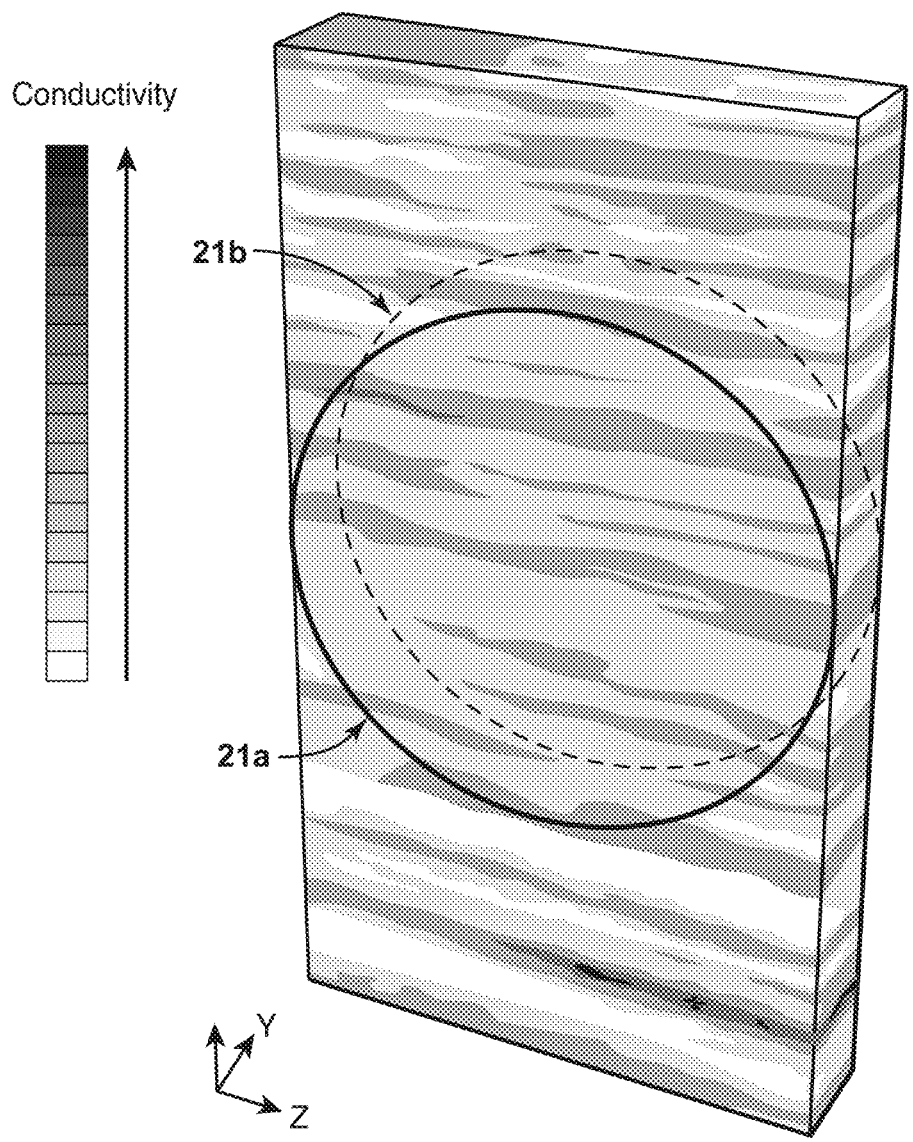
FIG. 6 is a model of electrical conductivity in a subsurface formation.
Figure 7:
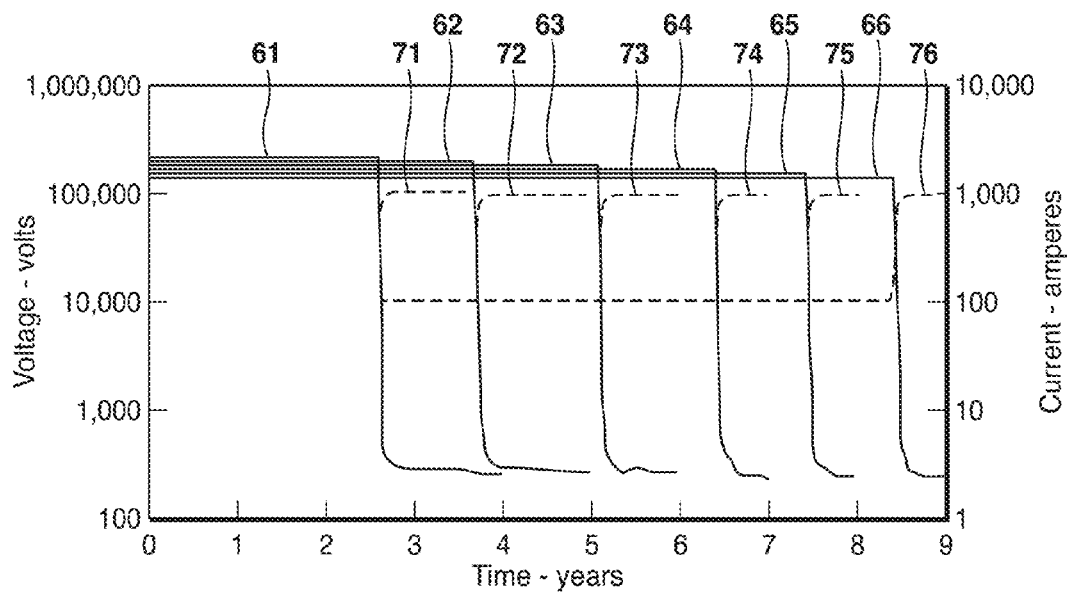
FIG. 7 is a chart of voltage delivered versus time and amperage delivered versus time.
Figure 8:
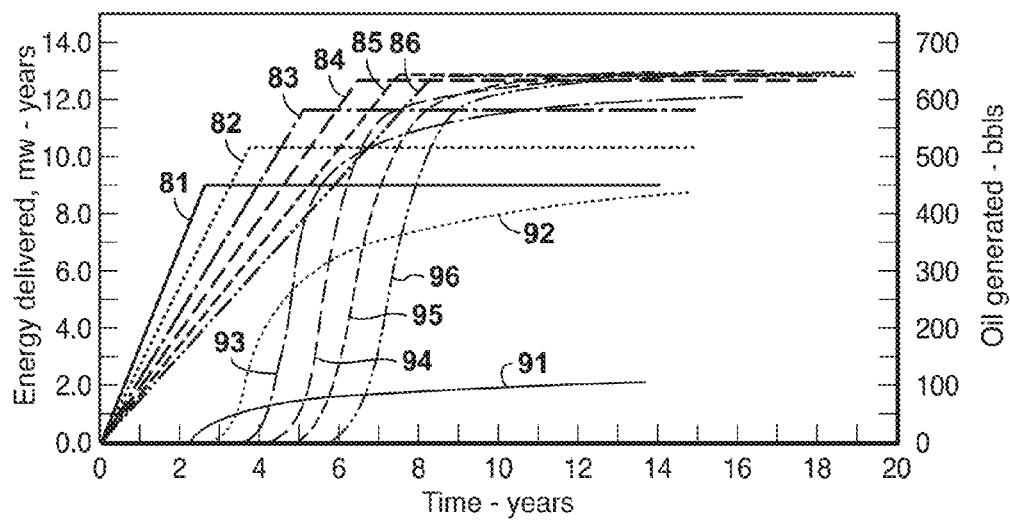
FIG. 8 is chart of energy delivered versus time and oil generated versus time.

FIGS. 6-8 show that if a lower heating rate of a rock system is attempted by delivering a lower energy amount, channeling may take longer to occur than if a higher heating rate of a rock system is attempted, by delivering a higher energy amount. FIG. 6 shows a first electrode 21*a* and a second electrode 21*b* formed by the creation of hydraulic fractures and impedance expressed as conductivity.

FIG. 7 shows the amount of voltage applied over time before channeling occurs and the amount of amperage applied over time before channeling occurs. Channeling occurs when each of the curves 61, 62, 63, 64, 65, 66, 71, 72, 73. 74, 75, 76 has a steep increase or decrease. Curves 61, 62, 63, 64, 65, 66 show channeling as a steep decline. Curves 71, 72, 73, 74, 75, 76 show channeling as a steep increase. Curves 61, 62, 63, 64, 65, 66 show voltage over time. Curves 71, 72, 73, 74, 75, 76 show amperage over time.

FIG. 8 shows the energy delivered versus time and oil generated versus time. For each curve 81, 82, 83, 84, 85, 86, 91, 92, 93, 94, 95, 96 shown in FIG. 8, the same amount of energy delivery is attempted to be delivered but the heating rates differ for each curve, thereby preventing the attempted energy delivery to be obtained. FIG. 8 shows that the faster the heating rate, the sooner channeling occurs. Specifically, the heating rate shown by curve 81 is faster than the heating rate shown by curve 82, which is faster than the heating rate shown by curve 83, which is faster than the heating rate shown by curve 84, which is faster than the heating rate shown by curve 85, which is faster than the heating rate shown by curve 86. As a result, electrical channeling, which is shown by the transition to nearly horizontal for each curve 81, 82, 83, 84, 85, 86, occurs faster for the heating rate shown by curve 81 than 82, faster for the heating rate shown by curve 82 than 83 and so on. FIG. 8 shows that the faster the heating rate, the less hydrocarbons pyrolyze because the sooner channeling occurs, resulting in less total energy being delivered. Specifically, the hydrocarbons generated shown by curve 91 are less than the hydrocarbons generated by curve 92, which are less than the hydrocarbons generated by curve 93, which are less than the hydrocarbons generated by curve 94, which are less than the hydrocarbons generated by curve 95, which are less than the hydrocarbons generated by curve 96. Channeling, which is shown by the substantially flat horizontal line for each curve 91, 92, 93, 94, 95, 96 causes the hydrocarbons generated by curve 91 to be less than the hydrocarbons generated by curve 92 and so on.

Thus, FIGS. 6-8 show a tradeoff. The higher the heating rate attempted, the sooner hydrocarbons will be generated as compared to lower heating rates because the faster the energy will be delivered over time. But the lower the heating rate applied, the more hydrocarbons will be generated as compared to higher heating rates because it will take longer for electrical channeling to occur. The lower the heating rate applied the slower the energy is delivered, thereby allowing thermal conduction to limit channeling. The lower the heating rate applied, the less likely electrical channeling may occur before reaching the attempted energy delivery.

Figure 9:
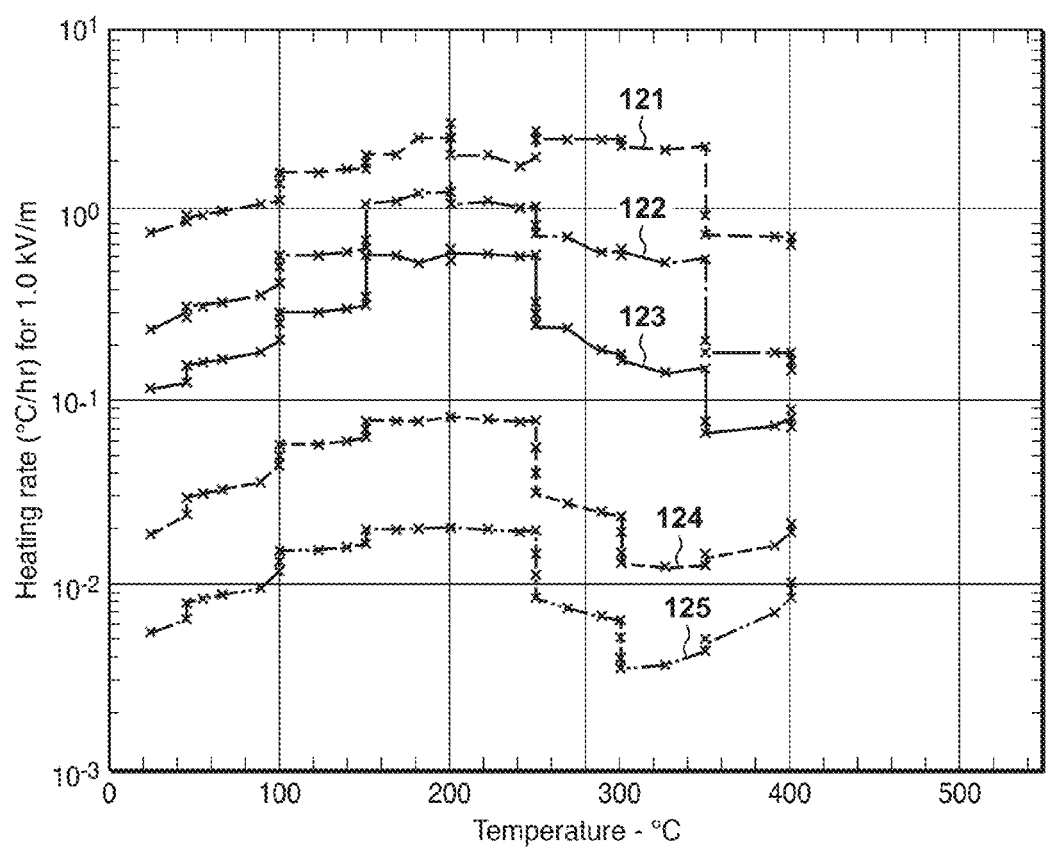
FIG. 9 is a chart showing a heating rate resulting from applying a voltage gradient of 1 kilovolt per meter versus temperature and frequency.

The methods and systems may comprise varying a frequency to keep a substantially constant energy delivery or constant energy delivery between hydraulic fractures. For example, the methods and systems may comprise varying the first frequency to keep a substantially constant energy delivery or constant energy delivery between the first hydraulic fracture 20*a* and the second hydraulic fracture 20*b*. The methods and systems may comprise varying a frequency to keep a substantially constant energy delivery or constant energy delivery between hydraulic fractures to keep a heating rate constant as temperature increases. Without varying the frequency, the heating rate may not remain constant as temperature increases. This is illustrated in FIG. 9 shows that for a specified voltage gradient (in this case 1 kilovolts (kV) per meter), the heating rate may be a function of both temperature and frequency. Curves 121 through 125 correspond to different frequencies. FIG. 9 shows that if frequency is held constant, the heating rate (and hence the energy delivery rate) may be a function of temperature. The heating rate being a function of temperature may be an indication that the rock impedance is a function of temperature. As a result, a substantially constant heating rate can be achieved by making adjustments to the frequency as temperature changes. This may be as opposed to varying the voltage gradient. As hydrocarbons are heated, the impedance of the hydrocarbons may change with temperature. Because the dependence of impedance on temperature may be weaker than the dependence of impedance on frequency, a substantially constant heating rate or constant heating rate may be obtained by varying frequency. This may be as opposed to varying voltage.

Figure 5:
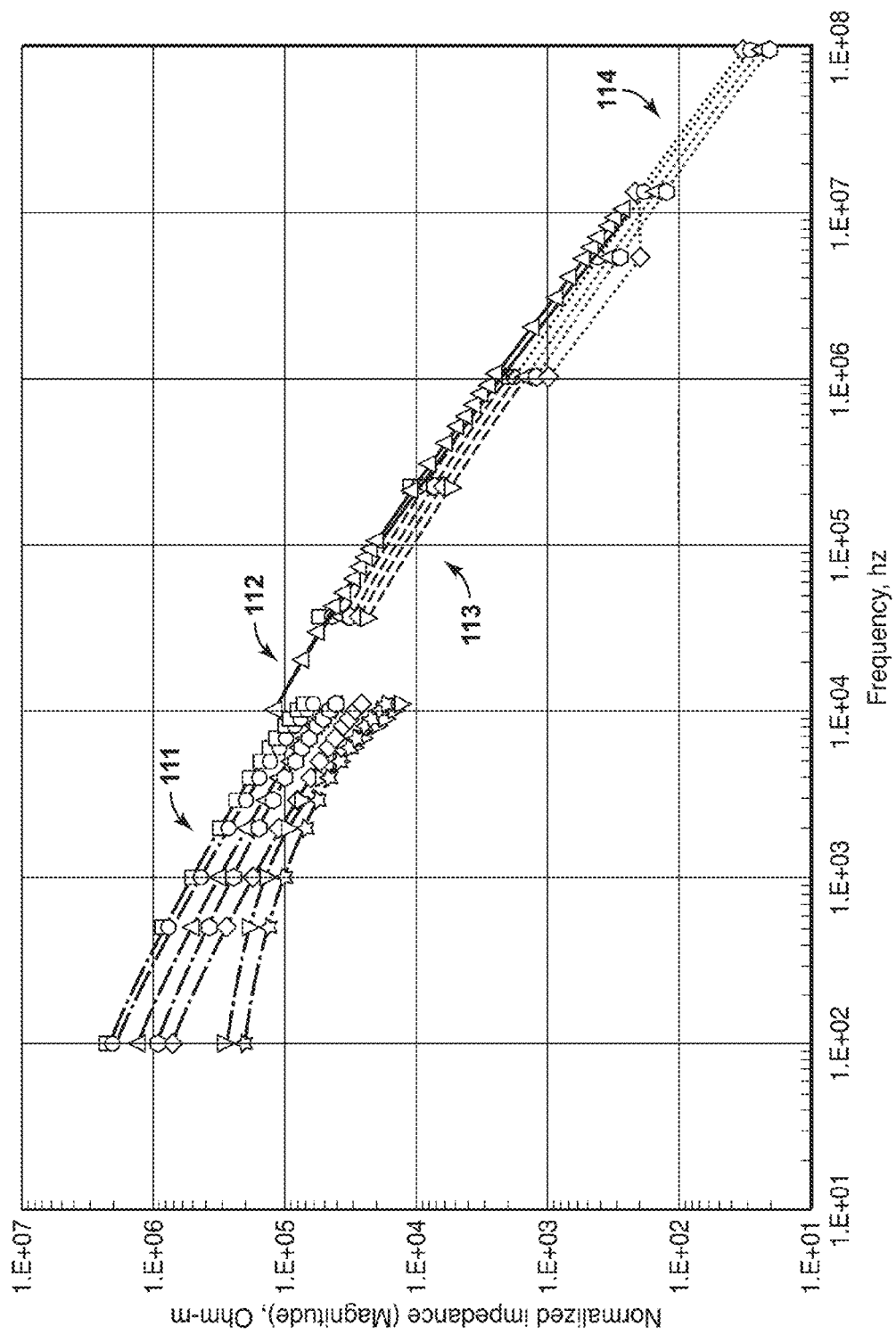
FIG. 5 is a chart of normalized impedance versus frequency.

The impedance of some rock systems, like organic-rich rock systems, may be complex. FIG. 5 shows the magnitude of the impedance of an organic-rich rock at four different locations 111, 112, 113, 114. Each of the four different locations is identified in FIG. 5 as a set of similar line style formats. The impedance of organic-rich rock has an imaginary part and a real part. The real and imaginary parts depend on frequency. The real parts determine heat generation. Both the real and imaginary parts determine the required voltage. Even though impedance depends on both frequency and voltage, it may be preferable to focus on increasing frequency rather than voltage so that a constant power may be applied when heating a subsurface formation including, for example, an organic-rich rock. Constant power may be applied by increasing frequency rather than by increasing voltage. For example, if hydraulic fracture dimensions are 400 feet high by 500 feet wide, resulting in 157,080 square foot area of a hydraulic fracture, the first hydraulic fracture is 100 feet from the second hydraulic fracture, the rock normalized impedance at about 10 Kilohertz (kHz) is 14430 Ohm-meters at −76 angular degrees, the rock normalized impedance at about 60 Hz is 201200 Ohm-meters at −63.4 angular degrees, the rock heat capacity is 0.3 BTU per pound degree Fahrenheit, the rock density is 137 pounds per foot cubed, the required pyrolysis temperature is 572 degrees Fahrenheit, the original rock temperature is 80 degrees Fahrenheit and the desired heating time is 6 years, the power requirement will be 1.774 Megawatts. Based on these above parameters, if the absolute impedance is 10 kHz, then the impedance real part is 7.31 Ohms, the impedance imaginary part is 29.24 Ohms, the required current is 492.7 Amperes and the required voltage is 14,849 Volts. In contrast, based on these above parameters, if the frequency is 60 Hz, then the impedance real part is 1,880 Ohms, the impedance imaginary part is 3,760 Ohms, the required current is 30.7 Amperes and the required voltage is 129,100 Volts. These calculations illustrate that increasing the frequency from 60 Hz to 10 kHz reduces the voltage requirement by almost an order of magnitude (i.e., from 129,100 Volts to 14,849 Volts) and increases the amperage requirement. The increase in frequency results in the same power being delivered at a substantially lower voltage.

The methods and systems may comprise mobilizing the hydrocarbons that are pyrolyzed as mobilized hydrocarbons. The mobilized hydrocarbons may be mobilized within the subsurface formation 101 by heating the subsurface formation 101. The methods and systems may comprise producing the mobilized hydrocarbons from the subsurface formation 101. Once produced from the subsurface formation 101, the hydrocarbons can be sent to facilities for refining or further processing such as but not limited to for upgrading to produce upgraded hydrocarbons. The upgraded hydrocarbons may be sold. Once produced from the subsurface formation 101, the hydrocarbons may be combined with a diluent stream and then sent to facilities and/or or sold. Once produced from the subsurface formation 101, the hydrocarbons may be sold.

It is important to note that the elements and steps depicted in FIGS. 1-10 are provided for illustrative purposes only and a particular step may not be required to perform the inventive methodologies. The claims, and only the claims, define the inventive system and methodologies.

The systems 100 and methods 2000 may include a mechanism for performing one or more of the operations herein. The mechanism may be specially constructed for the required purposes, or it may comprise a general-purpose computer selectively activated or reconfigured by a computer program stored in the computer. Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)). The computer-readable medium may be non-transitory.

Furthermore, as will be apparent to one of ordinary skill in the relevant art, the one or more of the modules, features, attributes, methodologies, and other aspects of the present disclosure can be implemented as software, hardware, firmware or any combination of the three. Of course, wherever a component of the present disclosure is implemented as software, the component can be implemented as a stand-alone program, as part of a larger program, as a plurality of separate programs, as a statically or dynamically linked library, as a kernel loadable module, as a device driver, and/or in every and any other way known now or in the future to those of skill in the art of computer programming. Additionally, the present disclosure is in no way limited to implementation in any specific operating system or environment.

Disclosed aspects may be used in hydrocarbon management activities. As used herein, "hydrocarbon mobilization," "hydrocarbon management" or "managing hydrocarbons" includes hydrocarbon extraction, hydrocarbon production of mobilized hydrocarbons, hydrocarbon exploration, identifying potential hydrocarbon resources, identifying well locations, determining well injection and/or extraction rates, identifying reservoir connectivity, acquiring, disposing of and/or abandoning hydrocarbon resources, reviewing prior hydrocarbon management decisions, and any other hydrocarbon-related acts or activities. The term "hydrocarbon management" is also used for the injection or storage of hydrocarbons or $CO_2$ (carbon dioxide), for example the sequestration of $CO_2$, such as reservoir evaluation, development planning, and reservoir management. The disclosed methodologies and techniques may be used to extract hydrocarbons from a subsurface region. Hydrocarbon extraction may be conducted to remove hydrocarbons from the subsurface region, which may be accomplished by drilling a well using oil drilling equipment. The equipment and techniques used to drill a well and/or extract the hydrocarbons are well known by those skilled in the relevant art. Other hydrocarbon extraction activities and, more generally, other hydrocarbon management activities, may be performed according to known principles.

It should be noted that the orientation of various elements may differ, and that such variations are intended to be encompassed by the present disclosure. It is recognized that features of the disclosure may be incorporated into other examples.

It should be understood that the preceding is merely a detailed description of this disclosure and that numerous changes, modifications, and alternatives can be made in accordance with the disclosure here without departing from the scope of the disclosure. The preceding description, therefore, is not meant to limit the scope of the disclosure. Rather, the scope of the disclosure is to be determined only by the appended claims and their equivalents. It is also contemplated that structures and features embodied in the present examples can be altered, rearranged, substituted, deleted, duplicated, combined, or added to each other.

What is claimed is:

1. A method of recovering hydrocarbons within a subsurface formation, comprising:
    forming a first electrode by creating a first hydraulic fracture within the subsurface formation and pumping a first electrically conductive material into the first hydraulic fracture;
    forming a second electrode by creating a second hydraulic fracture within the subsurface formation and pumping a second electrically conductive material into the second hydraulic fracture;
    electrically connecting a first power transmitting mechanism to the first electrode;
    electrically connecting a second power transmitting mechanism to the second electrode; and
    heating the subsurface formation between the first electrode and the second electrode by transmitting an electrical current via the first power transmitting mechanism to the first electrode and via the second power transmitting mechanism to the second electrode and by flowing the electrical current from the first electrode to the second electrode,
    wherein the electrical current comprises a first frequency and a second frequency, and the first frequency is between 60 Hertz and 500 Kilohertz.

2. The method of claim 1, wherein creating the first hydraulic fracture and pumping the first electrically conductive material occur simultaneously.

3. The method of claim 1, wherein creating the first hydraulic fracture occurs before pumping the first electrically conductive material.

4. The method of claim 1 wherein creating the second hydraulic fracture and pumping the second electrically conductive material occur simultaneously.

5. The method of claim 1 wherein creating the second hydraulic fracture occurs before pumping the second electrically conductive material.

6. The method of claim 1 wherein the first hydraulic fracture is within a first wellbore and wherein the second hydraulic fracture is within a second wellbore that is separate from the first wellbore.

7. The method of claim 1, wherein the first hydraulic fracture and the second hydraulic fracture are within a first wellbore.

8. The method of claim 1, wherein the first hydraulic fracture is between 20 to 100 feet from the second hydraulic fracture.

9. The method of claim 1, wherein a height of the first hydraulic fracture is between 50 to 1000 feet and is perpendicular to a width of the first hydraulic fracture, and wherein a height of the second hydraulic fracture is between 50 to 1000 feet and is perpendicular to a width of the second hydraulic fracture.

10. The method of claim 1, wherein the first hydraulic fracture is at least one of substantially horizontal and substantially vertical and the second hydraulic fracture is at least one of substantially horizontal and substantially vertical.

11. The method of claim 1, wherein the first electrically conductive material is a same material as the second electrically conductive material.

12. The method of claim 1, wherein the first electrically conductive material is a different material from the second electrically conductive material.

13. The method of claim 1, wherein the first electrically conductive material is one of a graphite cement slurry, a graphite slurry, a carbon black slurry and metal coated spheres.

14. The method of claim 1, wherein the second electrically conductive material is one of a graphite cement slurry, a graphite slurry, a carbon black slurry and metal coated spheres.

15. The method of claim 1, wherein the first power transmitting mechanism is separate from the second power transmitting mechanism.

16. The method of claim 15, wherein the first power transmitting mechanism comprises a first wire and the second power transmitting mechanism comprises a second wire.

17. The method of claim 1, wherein the electrical current comprises an alternating electrical current.

18. The method of claim 17, wherein the second frequency is at least ten times greater than the first frequency.

19. The method of claim 18, wherein the second frequency has at least 33% of electrical power associated with the first frequency.

20. The method of claim 1, wherein heating the subsurface formation comprises generating heat within an organic-rich rock between the first electrode and the second electrode.

21. The method of claim 1, wherein heating the subsurface formation further comprises thermally conducting heat from a portion of the organic-rich rock to other portions of the organic-rich rock.

22. The method of claim 1, wherein heating the subsurface formation further comprises applying a first voltage to the first electrode via the first power transmitting mechanism and applying a second voltage to the second electrode via the second power transmitting mechanism.

23. The method of claim 1, wherein the first frequency is between 60 Hertz and 200 Kilohertz.

24. The method of claim 1, further comprising determining a first voltage amount of the first voltage and a second voltage amount of the second voltage by calculating an energy amount to be delivered to the subsurface formation to heat the subsurface formation.

25. The method of claim 1, further comprising varying the first frequency to keep a constant energy delivery between the first hydraulic fracture and the second hydraulic fracture.

26. The method of claim 1, further comprising:
forming a third electrode by creating a third hydraulic fracture within the subsurface formation and by pumping a third electrically conductive material into the third hydraulic fracture; and
electrically connecting a third power transmitting mechanism to the third electrode, and
wherein heating the subsurface formation further comprises heating the subsurface formation between the first electrode, the second electrode and the third electrode by transmitting the electrical current via the first power transmitting mechanism, via the second power transmitting mechanism to the second electrode, and via the third power transmitting mechanism to the third electrode and by flowing the electrical current between the first electrode, the second electrode and the third electrode, and
wherein the electrical current comprises a first frequency and a second frequency, and the first frequency is between 60 Hertz and 500 Kilohertz.

27. The method of claim 26, wherein the second frequency is at least ten times greater than the first frequency.

28. The method of claim 27, wherein the second frequency has at least 33% of electrical power associated with the first frequency.

29. The method of claim 1, further comprising:
mobilizing the hydrocarbons as mobilized hydrocarbons within the subsurface formation by heating the subsurface formation; and
producing the mobilized hydrocarbons from the subsurface formation.

* * * * *